(12) United States Patent
Miller et al.

(10) Patent No.: US 7,166,058 B2
(45) Date of Patent: *Jan. 23, 2007

(54) CONTINUOUSLY VARIABLE TRANSMISSION

(75) Inventors: Donald C. Miller, Fallbrook, CA (US); David John Allen, Encinitas, CA (US)

(73) Assignee: Fallbrook Technologies Inc., San Diego, CA (US)

(*) Notice: Subject to any disclaimer, the term of this patent is extended or adjusted under 35 U.S.C. 154(b) by 85 days.

This patent is subject to a terminal disclaimer.

(21) Appl. No.: 11/006,355

(22) Filed: Dec. 6, 2004

(65) Prior Publication Data

US 2005/0119093 A1   Jun. 2, 2005

Related U.S. Application Data

(63) Continuation of application No. 10/770,966, filed on Feb. 3, 2004, now Pat. No. 6,949,049, which is a continuation of application No. 10/134,097, filed on Apr. 25, 2002, now Pat. No. 6,689,012.

(60) Provisional application No. 60/286,803, filed on Apr. 26, 2001.

(51) Int. Cl.
   *F16H 13/10*   (2006.01)

(52) U.S. Cl. ............................ 476/45; 476/37; 476/61

(58) Field of Classification Search ................ 476/40, 476/41, 42, 36, 37, 38, 45, 61
See application file for complete search history.

(56) References Cited

U.S. PATENT DOCUMENTS

| | | |
|---|---|---|
| 719,595 A | 2/1903 | Huss |
| 1,121,210 A | 12/1914 | Techel |
| 1,175,677 A | 3/1916 | Barnes |
| 1,858,696 A | 5/1932 | Weiss |
| 1,930,228 A | 3/1933 | Thomson |
| 2,060,884 A | 11/1936 | Madle |
| 2,086,491 A | 7/1937 | Dodge |
| 2,112,763 A | 3/1938 | Cloudsley |
| 2,152,796 A | 4/1939 | Erban |
| 2,209,254 A | 7/1940 | Ahnger |
| 2,469,653 A | 5/1949 | Kopp |
| 2,596,538 A | 5/1952 | Dicke |

(Continued)

FOREIGN PATENT DOCUMENTS

CN   1157379 A   8/1997

(Continued)

*Primary Examiner*—David Fenstermacher
(74) *Attorney, Agent, or Firm*—Knobbe, Martens, Olson & Bear LLP

(57) ABSTRACT

A continuously variable transmission is disclosed for use in rotationally or linearly powered machines and vehicles. The transmission provides a simple manual shifting method for the user. Further, the practical commercialization of traction roller transmissions requires improvements in the reliability, ease of shifting, function and simplicity of the transmission. The present invention includes a continuously variable transmission that may be employed in connection with any type of machine that is in need of a transmission. For example, the transmission may be used in (i) a motorized vehicle such as an automobile, motorcycle, or watercraft, (ii) a non-motorized vehicle such as a bicycle, tricycle, scooter, exercise equipment or (iii) industrial equipment, such as a drill press, power generating equipment, or textile mill.

20 Claims, 17 Drawing Sheets

U.S. PATENT DOCUMENTS

| | | | |
|---|---|---|---|
| 2,675,713 A | 4/1954 | Acker | |
| 2,730,904 A | 7/1956 | Rennerfelt | |
| 2,931,234 A | 4/1960 | Hayward | |
| 2,931,235 A | 4/1960 | Hayward | |
| 2,959,063 A | 11/1960 | Perry | |
| 2,959,972 A | 11/1960 | Madson | |
| 3,248,960 A | 5/1966 | Schottler | |
| 3,273,468 A | 9/1966 | Allen | |
| 3,280,646 A | 10/1966 | Lemieux | |
| 3,487,726 A | 1/1970 | Burnett | |
| 3,487,727 A | 1/1970 | Gustafsson | |
| 3,661,404 A | 5/1972 | Bossaer | |
| 3,695,120 A | 10/1972 | Titt | |
| 3,707,888 A | 1/1973 | Schottler | |
| 3,736,803 A | 6/1973 | Horowitz et al. | |
| 3,768,715 A | 10/1973 | Tout | |
| 3,996,807 A | 12/1976 | Adams | |
| 4,177,683 A | 12/1979 | Moses | |
| 4,227,712 A | 10/1980 | Dick | |
| 4,391,156 A | 7/1983 | Tibbals | |
| 4,459,873 A | 7/1984 | Black | |
| 4,574,649 A | 3/1986 | Seol | |
| 4,585,429 A | 4/1986 | Marier | |
| 4,630,839 A | 12/1986 | Seol | |
| 4,700,581 A | 10/1987 | Tibbals, Jr. | |
| 4,735,430 A | 4/1988 | Tomkinson | |
| 4,756,211 A | 7/1988 | Fellows | |
| 4,856,374 A | 8/1989 | Kreuzer | |
| 4,869,130 A | 9/1989 | Wiecko | |
| 4,900,046 A | 2/1990 | Aranceta-Angoitia | |
| 4,909,101 A | 3/1990 | Terry | |
| 5,020,384 A | 6/1991 | Kraus | |
| 5,037,361 A | 8/1991 | Takahashi | |
| 5,069,655 A | 12/1991 | Schivelbusch | |
| 5,121,654 A | 6/1992 | Fasce | |
| 5,125,677 A | 6/1992 | Ogilvie et al. | |
| 5,156,412 A | 10/1992 | Meguerditchian | |
| 5,230,258 A | 7/1993 | Nakano | |
| 5,236,211 A | 8/1993 | Meguerditchian | |
| 5,236,403 A | 8/1993 | Schivelbusch | |
| 5,318,486 A | 6/1994 | Lutz | |
| 5,379,661 A | 1/1995 | Nakano | |
| 5,383,677 A | 1/1995 | Thomas | |
| 5,451,070 A | 9/1995 | Lindsay et al. | |
| 5,601,301 A | 2/1997 | Liu | |
| 5,645,507 A | 7/1997 | Hathaway | |
| 6,186,922 B1 * | 2/2001 | Bursal et al. | 476/18 |
| 6,241,636 B1 | 6/2001 | Miller | |
| 6,322,475 B1 | 11/2001 | Miller | |
| 6,325,386 B1 * | 12/2001 | Shoge | 277/500 |
| 6,419,608 B1 | 7/2002 | Miller | |
| 6,689,012 B1 * | 2/2004 | Miller et al. | 476/37 |
| 6,949,049 B1 * | 9/2005 | Miller et al. | 476/45 |
| 7,063,640 B1 | 6/2006 | Miller | |
| 2004/0224808 A1 | 11/2004 | Miller et al. | |
| 2005/0209041 A1 | 9/2005 | Miller | |

FOREIGN PATENT DOCUMENTS

| | | |
|---|---|---|
| DE | 498 701 | 5/1930 |
| DE | 2 310 880 | 9/1974 |
| DE | 21 36 243 | 1/1975 |
| DE | 39 40 919 A1 | 6/1991 |
| EP | 0 432 742 A1 | 12/1990 |
| GB | 592320 | 9/1947 |
| GB | 906 002 | 9/1962 |
| GB | 1 376 057 | 12/1974 |
| GB | 2 035 482 | 6/1980 |
| GB | 2 080 452 | 8/1982 |
| JP | 42-2844 | 2/1967 |
| JP | 51-150380 | 12/1976 |
| JP | 47-20535 | 8/1977 |
| JP | 53048166 A | 5/1978 |
| JP | 55-135259 | 4/1979 |
| JP | 02157483 | 6/1990 |
| JP | 52-35481 | 9/1993 |
| JP | 411063130 | 3/1999 |
| JP | 2004162652 A | 6/2004 |
| WO | WO99/20918 | 4/1999 |
| WO | WO138758 A1 | 5/2001 |

* cited by examiner

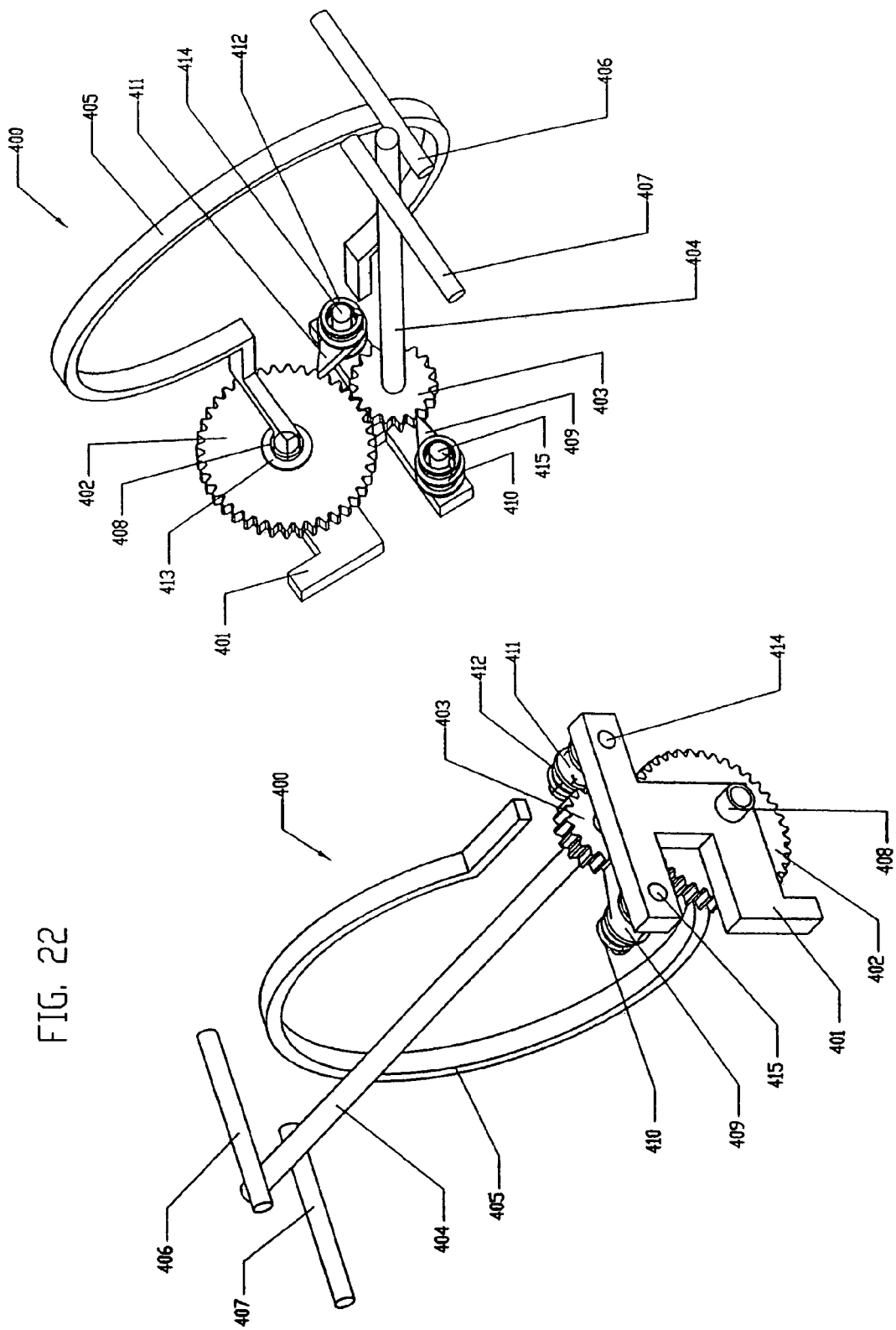

CONTINUOUSLY VARIABLE TRANSMISSION

RELATED APPLICATIONS

This application is a continuation of and claims priority to U.S. application Ser. No. 10/770,966 filed on Feb. 3, 2004, which issued as U.S. Pat. No. 6,949,049 on Sep. 27, 2005, which claims priority from U.S. application Ser. No. 10/134,097 filed on Apr. 25, 2002, which issued as U.S. Pat. No. 6,689,012 on Feb. 2, 2004, which in turn claims priority from U.S. Provisional Application No. 60/286,803, filed Apr. 26, 2001. The entire disclosure of each of those applications is hereby incorporated by reference.

BACKGROUND OF THE INVENTION

1. Field of the Invention

The field of the invention relates generally to transmissions, and more particularly the invention relates to continuously variable transmissions.

2. Description of the Related Art

The present invention relates to the field of continuously variable transmissions and includes several novel features and inventive aspects that have been developed and are improvements upon the prior art. In order to provide an infinitely variable transmission, various traction roller transmissions in which power is transmitted through traction rollers supported in a housing between torque input and output disks have been developed. In such transmissions, the traction rollers are mounted on support structures which, when pivoted, cause the engagement of traction rollers with the torque disks in circles of varying diameters depending on the desired transmission ratio.

However, the success of these traditional solutions has been limited. For example, in one solution, a driving hub for a vehicle with a variable adjustable transmission ratio is disclosed. This method teaches the use of two iris plates, one on each side of the traction rollers, to tilt the axis of rotation of each of the rollers. However, the use of iris plates can be very complicated due to the large number of parts that are required to adjust the iris plates during transmission shifting. Another difficulty with this transmission is that it has a guide ring that is configured to be predominantly stationary in relation to each of the rollers. Since the guide ring is stationary, shifting the axis of rotation of each of the traction rollers is difficult.

One improvement over this earlier design includes a shaft about which a driving member and a driven member rotate. The driving member and driven member are both mounted on the shaft and contact a plurality of power adjusters disposed equidistantly and radially about the shaft. The power adjusters are in frictional contact with both members and transmit power from the driving member to the driven member. A support member located concentrically over the shaft and between the power adjusters applies a force to keep the power adjusters separate so as to make frictional contact against the driving member and the driven member. A limitation of this design is the absence of means for generating an adequate axial force to keep the driving and driven members in sufficient frictional contact against the power adjusters as the torque load on the transmission changes. A further limitation of this design is the difficulty in shifting that results at high torque and very low speed situations as well as insufficient means for disengaging the transmission and coasting.

Therefore, there is a need for a continuously variable transmission with an improved power adjuster support and shifting mechanism, means of applying proper axial thrust to the driving and driven members for various torque and power loads, and means of disengaging and reengaging the clutch for coasting.

SUMMARY OF THE INVENTION

The systems and methods have several features, no single one of which is solely responsible for its desirable attributes. Without limiting the scope as expressed by the claims that follow, its more prominent features will now be discussed briefly. After considering this discussion, and particularly after reading the section entitled "Detailed Description of the Preferred Embodiments" one will understand how the features of the system and methods provide several advantages over traditional systems and methods.

In one aspect, a continuously variable transmission is disclosed having a longitudinal axis, and a plurality of speed adjusters. Each speed adjuster has a tiltable axis of rotation is located radially outward from the longitudinal axis. Also provided are a drive disk that is annularly rotatable about the longitudinal axis and also contacts a first point on each of the speed adjusters and a support member that is also annularly rotatable about the longitudinal axis. A bearing disk is provided that is annularly rotatable about the longitudinal axis as well, and at least two axial force generators. The axial force generators are located between the drive disk and the bearing disk and each axial force generator is configured to apply an axial force to the drive disk.

In another aspect, a bearing disk annularly rotatable about the longitudinal axis is disclosed along with a disengagement mechanism. The disengagement mechanism can be positioned between the bearing disk and the drive disk and is adapted to cause the drive disk to disengage the drive disk from the speed adjusters.

In yet another aspect, an output disk or rotatable hub shell is disclosed along with a bearing disk that is annularly rotatable about the longitudinal axis of the transmission. A support member is included that is annularly rotatable about the longitudinal axis as well, and is adapted to move toward whichever of the drive disk or the output disk is rotating more slowly.

In still another aspect, a linkage subassembly having a hook is disclosed, wherein the hook is attached to either the drive disk or the bearing disk. Included is a latch attached to either the drive disk or and the bearing disk.

In another aspect, a plurality of spindles having two ends is disclosed, wherein one spindle is positioned in the bore of each speed adjuster and a plurality of spindle supports having a platform end and spindle end is provided. Each spindle support is operably engaged with one of the two ends of one of the spindles. Also provided is a plurality of spindle support wheels, wherein at least one spindle support wheel is provided for each spindle support. Included are annular first and second stationary supports each having a first side facing the speed adjusters and a second side facing away from the speed adjusters. Each of the first and second stationary supports have a concave surface on the first side and the first stationary support is located adjacent to the drive disk and the second stationary support is located adjacent to the driven disk.

Also disclosed is a continuously variable transmission having a coiled spring that is positioned between the bearing disk and the drive disk.

In another aspect, a transmission shifting mechanism is disclosed comprising a rod, a worm screw having a set of external threads, a shifting tube having a set of internal threads, wherein a rotation of the shifting tube causes a change in the transmission ratio, a sleeve having a set of internal threads, and a split shaft having a threaded end.

In yet another aspect, a remote transmission shifter is disclosed comprising a rotatable handlegrip, a tether having a first end and a second end, wherein the first end is engaged with the handlegrip and the second end is engaged with the shifting tube. The handlegrip is adapted to apply tension to the tether, and the tether is adapted to actuate the shifting tube upon application of tension.

These and other improvements will become apparent to those skilled in the art as they read the following detailed description and view the enclosed figures.

BRIEF DESCRIPTION OF THE DRAWINGS

FIG. 22 is a perspective view of an alternative disengagement mechanism of the transmission of FIG. 1.

FIG. 23 is another perspective view of the alternative disengagement mechanism of FIG. 22.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The transmissions described herein are of the type that utilize speed adjuster balls with axes that tilt as described in U.S. patent application Ser. No. 09/695,757, filed on Oct. 24, 2000 and the information disclosed in that application is hereby incorporated by reference for all that it discloses. A drive (input) disk and a driven (output) disk are in contact with the speed adjuster balls. As the balls tilt on their axes, the point of rolling contact on one disk moves toward the pole or axis of the ball, where it contacts the ball at a circle of decreasing diameter, and the point of rolling contact on the other disk moves toward the equator of the ball, thus contacting the disk at a circle of increasing diameter. If the axis of the ball is tilted in the opposite direction, the disks respectively experience the converse situation. In this manner, the ratio of rotational speed of the drive disk to that of the driven disk, or the transmission ratio, can be changed over a wide range by simply tilting the axes of the speed adjuster balls.

With reference to the longitudinal axis of embodiments of the transmission, the drive disk and the driven disk can be located radially outward from the speed adjuster balls, with an idler-type generally cylindrical support member located radially inward from the speed adjuster balls, so that each ball makes three-point contact with the inner support member and the outer disks. The drive disk, the driven disk, and the support member can all rotate about the same longitudinal axis. The drive disk and the driven disk can be shaped as simple disks or can be concave, convex, cylindrical or any other shape, depending on the configuration of the input and output desired. The rolling contact surfaces of the disks where they engage the speed adjuster balls can have a flat, concave, convex or other profile, depending on the torque and efficiency requirements of the application.

Figure 1:
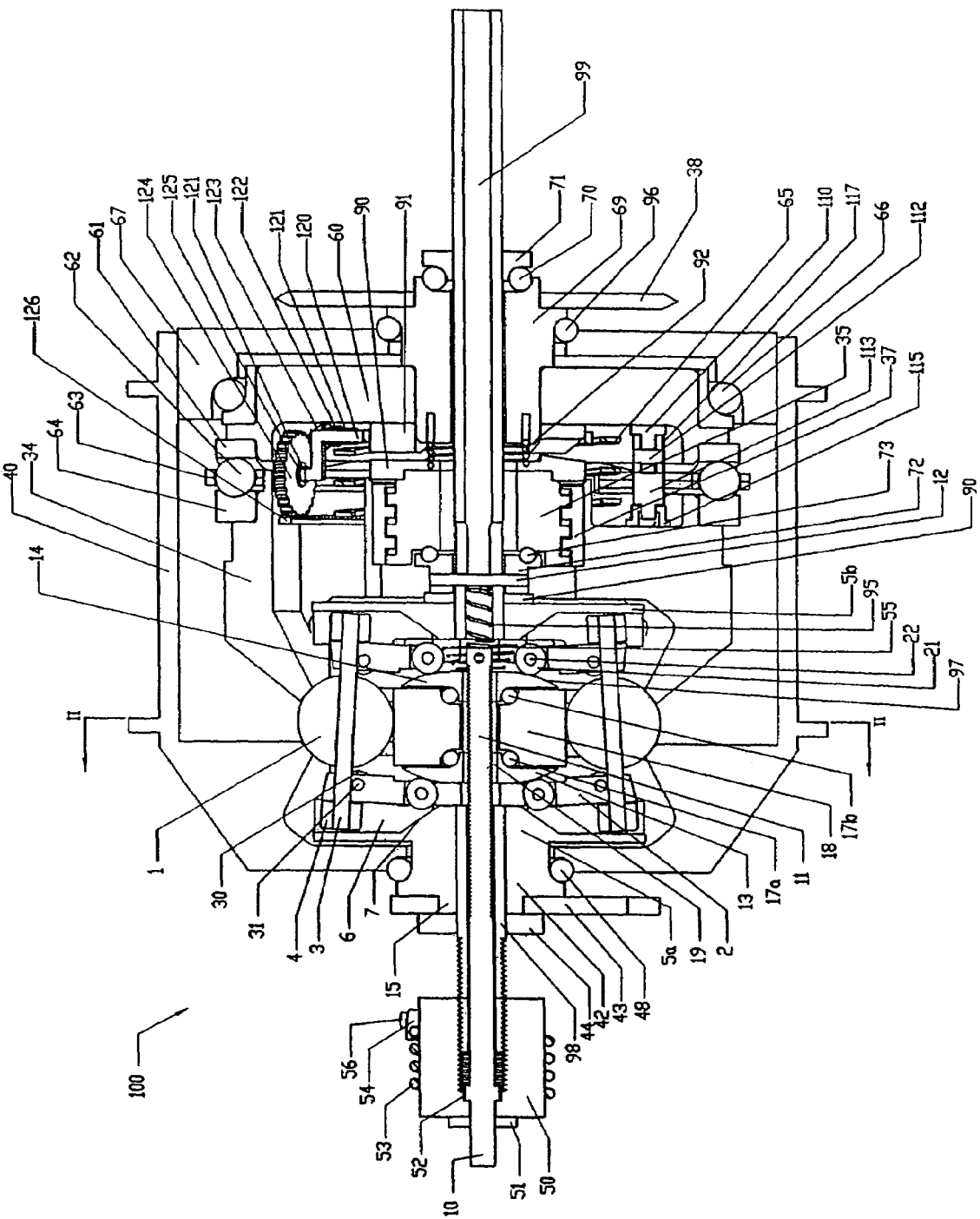
FIG. 1 is a cutaway side view of an embodiment of the transmission.
Figure 2:
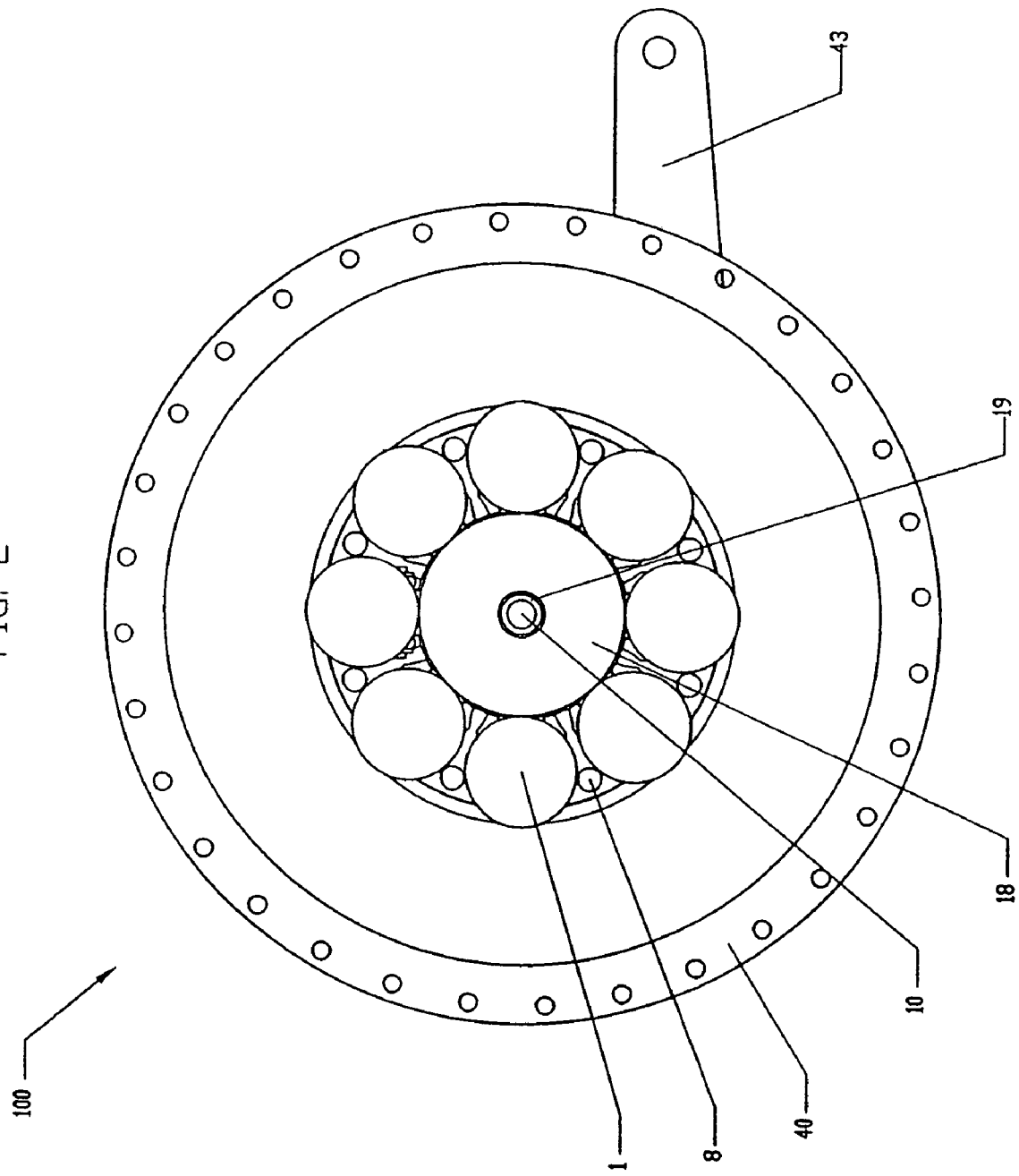
FIG. 2 is a partial end cross-sectional view taken on line II—II of FIG. 1.

Referring to FIGS. 1 and 2, an embodiment of a continuously variable transmission 100 is disclosed. The transmission 100 is shrouded in a hub shell 40, which functions as an output disk and is desirable in various applications, including those in which a vehicle (such as a bicycle or motorcycle) has the transmission contained within a driven wheel. The hub shell 40 can, in certain embodiments, be covered by a hub cap 67. At the heart of the transmission 100 are a plurality of speed adjusters 1 that can be spherical in shape and are circumferentially spaced more or less equally or symmetrically around the centerline, or axis of rotation, of the transmission 100. In the illustrated embodiment, eight speed adjusters 1 are used. However, it should be noted that more or fewer speed adjusters 1 can be used depending on the use of the transmission 100. For example, the transmission may include 3, 4, 5, 6, 7, 8, 9, 10, 11, 12, 13, 14, 15 or more speed adjusters. The provision for more than 3, 4, or 5 speed adjusters can provide certain advantages including, for example, widely distributing the forces exerted on the individual speed adjusters 1 and their points of contact with other components of the transmission 100. Certain embodiments in applications with low torque but a high transmission ratio can use few speed adjusters 1 but large speed adjusters 1, while certain embodiments in applications where high torque and a transmission high transmission ratio can use many speed adjusters 1 and large speed adjusters 1. Other embodiments in applications with high torque and a low transmission ratio can use many speed adjusters 1 and small speed adjusters 1. Finally, certain embodiments in applications with low torque and a low transmission ratio may use few speed adjusters 1 and small speed adjusters 1.

Spindles 3 are inserted through holes that run through the center of each of the speed adjusters 1 to define an axis of rotation for each of the speed adjusters 1. The spindles 3 are generally elongated shafts about which the speed adjusters 1 rotate, and have two ends that extend out of either end of the hole through the speed adjusters 1. Certain embodiments will have cylindrical shaped spindles 3, though any shape can be used. The speed adjusters 1 are mounted to freely rotate about the spindles 3. In FIG. 1, the axes of rotation of the speed adjusters 1 are shown in an approximately horizontal direction (i.e., parallel to the main axis of the transmission 100).

Figure 4:
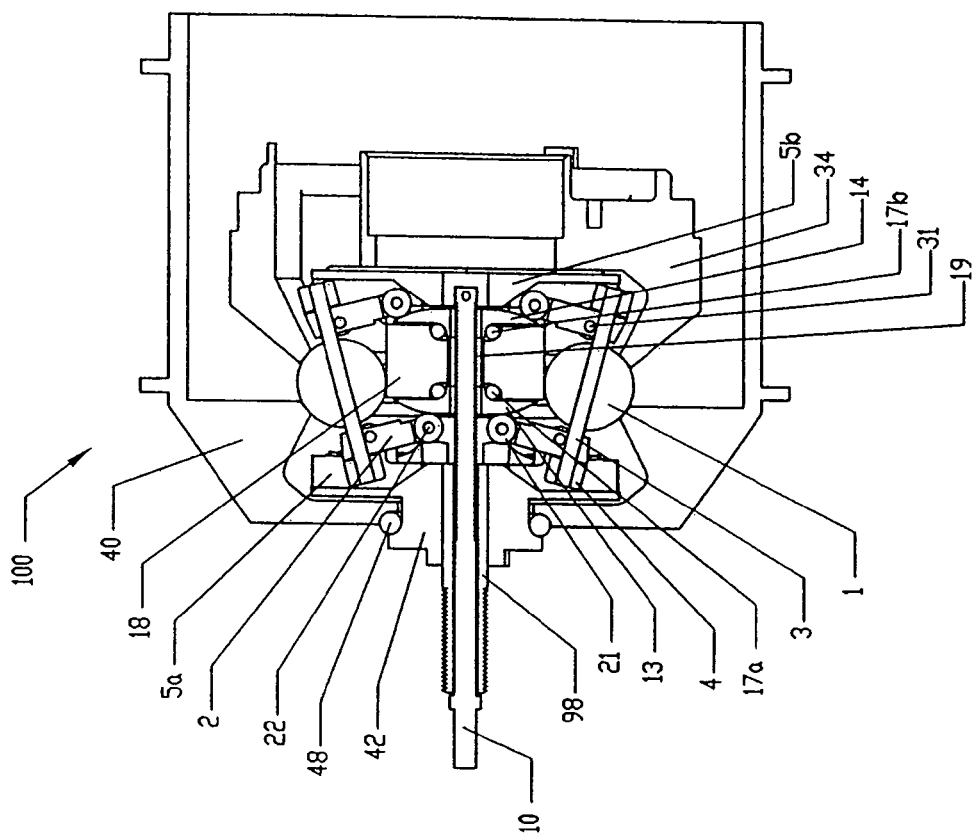
FIG. 4 is a schematic cutaway side view of the transmission of FIG. 1 shifted into low.
Figure 5:
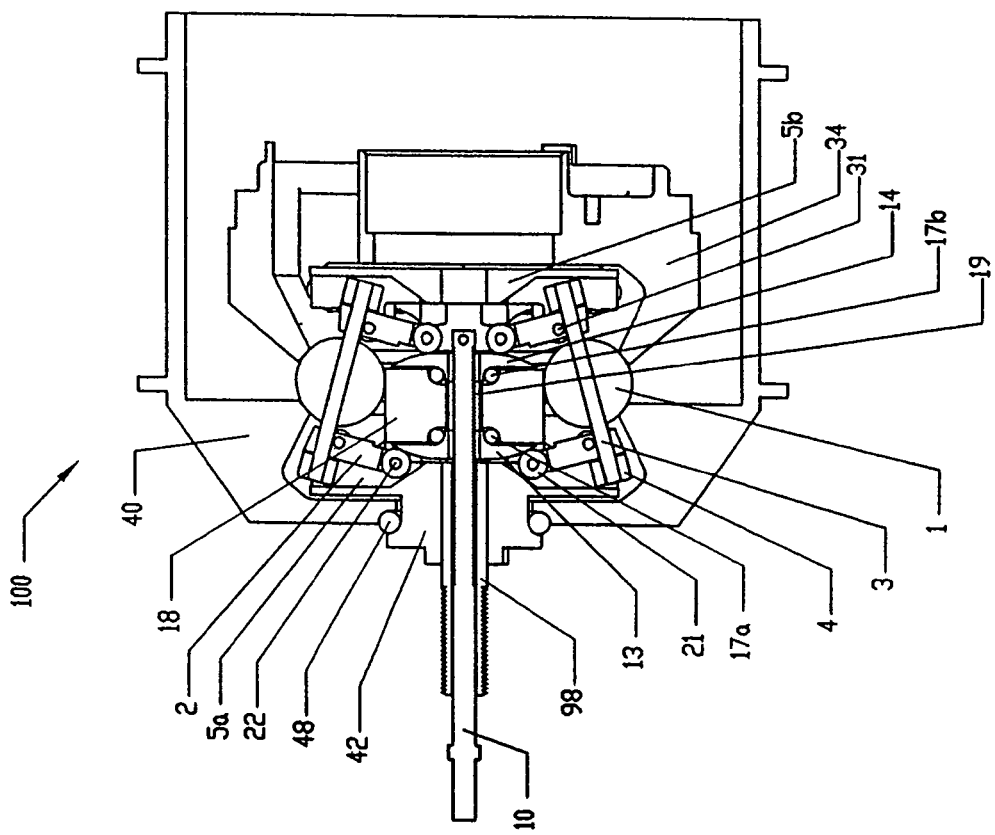
FIG. 5 is a schematic cutaway side view of the transmission of FIG. 1 shifted into high.

FIGS. 1, 4 and 5, can be utilized to describe how the axes of the speed adjusters 1 can be tilted in operation to shift the transmission 100. FIG. 4 depicts the transmission 100 shifted into a low transmission ratio, or low, while FIG. 5 depicts the transmission 100 shifted into a high transmission ratio, or high. Now also referring to FIGS. 9 and 10, a plurality of spindle supports 2 are attached to the spindles 3 near each of the ends of the spindles 3 that extend out of the holes bored through the speed adjusters 1, and extend radially inward from those points of attachment toward the axis of the transmission 100. In one embodiment, each of the spindle supports 2 has a through bore that receives one end of one of the spindles 3. The spindles 3 preferably extend through and beyond the spindle supports 2 such that they have an exposed end. In the embodiments illustrated, the spindles 3 advantageously have spindle rollers 4 coaxially and slidingly positioned over the exposed ends of the spindles 3. The spindle rollers 4 are generally cylindrical wheels fixed axially on the spindles 3 outside of and beyond the spindle supports 2 and rotate freely about the spindles 3. Referring also to FIG. 11, the spindle rollers 4 and the ends of the spindles 3 fit inside grooves 6 that are cut into a pair of stationary supports 5a, 5b.

Referring to FIGS. 4, 5 and 11, the stationary supports 5a, 5b are generally in the form of parallel disks annularly located about the axis of the transmission on either side of the power adjusters 1. As the rotational axes of the speed adjusters 1 are changed by moving the spindle supports 2 radially out from the axis of the transmission 100 to tilt the spindles 3, each spindle roller 4 fits into and follows a groove 6 cut into one of the stationary supports 5a, 5b. Any radial force, not rotational but a transaxial force, the speed adjusters 1 may apply to the spindles 3 is absorbed by the spindles 3, the spindle rollers 4 and the sides 81 of the grooves 6 in the stationary supports 5a, 5b. The stationary supports 5a, 5b are mounted on a pair of split shafts 98, 99 positioned along the axis of the transmission 100. The split shafts 98, 99 are generally elongated cylinders that define a substantial portion of the axial length of the transmission 100 and can be used to connect the transmission 100 to the object that uses it. Each of the split shafts 98, 99 has an inside end near the middle of the transmission 100 and an outside end that extends out of the internal housing of the transmission 100. The split shafts 98, 99 are preferably hollow so as to house other optional components that may be implemented. The stationary supports 5a, 5b, each have a bore 82, through which the split shafts 98, 99 are inserted and rigidly attached to prevent any relative motion between the split shafts 98, 99 and the stationary supports 5a, 5b. The stationary supports 5a, 5b are preferably rigidly attached to the ends of the split shafts 98, 99 closest to the center of the transmission 100. A stationary support nut 90 may be threaded over the split shaft 99 and tightened against the stationary support 5b on corresponding threads of the stationary support 5a, 5b. The grooves 6 in the stationary supports 5a, 5b referred to above, extend from the outer circumference of the stationary supports 5a, 5b radially inwardly towards the split shafts 98, 99. In most embodiments, the groove sides 81 of the grooves 6 are substantially parallel to allow the spindle rollers 4 to roll up and down the groove sides 81 as the transmission 100 is shifted. Also, in certain embodiments, the depth of the grooves 6 is substantially constant at the circumference 9 of the stationary supports 5a, 5b, but the depth of the grooves 6 becomes shallower at points 7 closer to the split shaft 98, 99, to correspond to the arc described by the ends of the spindles 3 as they are tilted, and to increase the strength of the stationary supports 5a, 5b. As the transmission 100 is shifted to a lower or higher transmission ratio by changing the rotational axes of the speed adjusters 1, each one of the pairs of spindle rollers 4, located on the opposite ends of a single spindle 3, move in opposite directions along their corresponding grooves 6.

Figure 9:
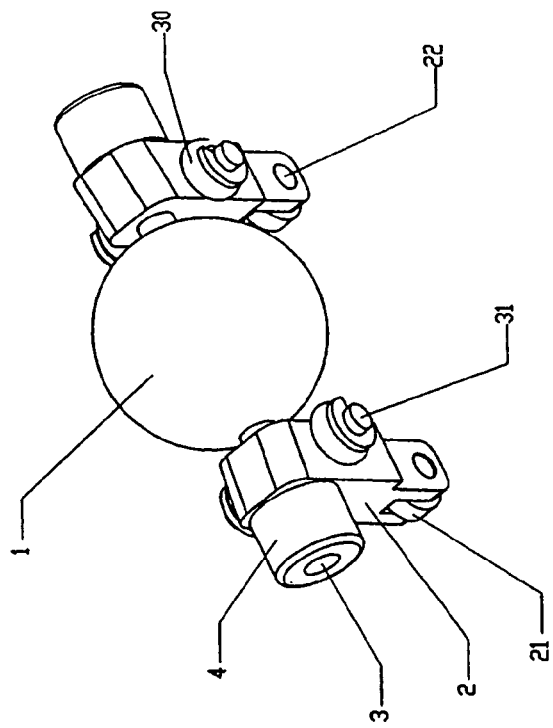
FIG. 9 is a perspective view of the power adjuster sub-assembly of the transmission of FIG. 1.
Figure 12:
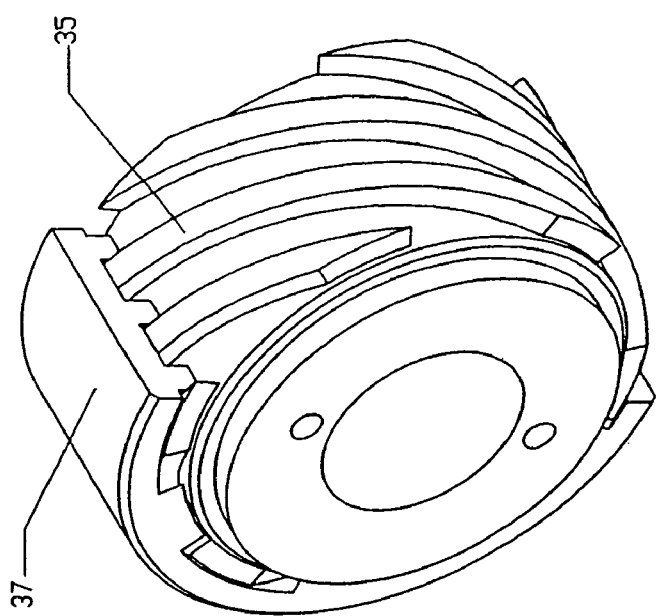
FIG. 12 is a perspective view of the screw and nut of the transmission of FIG. 1.

Referring to FIGS. 9 and 11, stationary support wheels 30 can be attached to the spindle supports 2 with stationary support wheel pins 31 or by any other attachment method. The stationary support wheels 30 are coaxially and slidingly mounted over the stationary support wheel pins 31 and secured with standard fasteners, such as ring clips for example. In certain embodiments, one stationary support wheel 30 is positioned on each side of a spindle 2 with enough clearance to allow the stationary support wheels 30 to roll radially on concave surfaces 84 of the stationary supports 5a, 5b when the transmission 100 is shifted. In certain embodiments, the concave surfaces 84 are concentric with the center of the speed adjusters 1.

Figure 3:
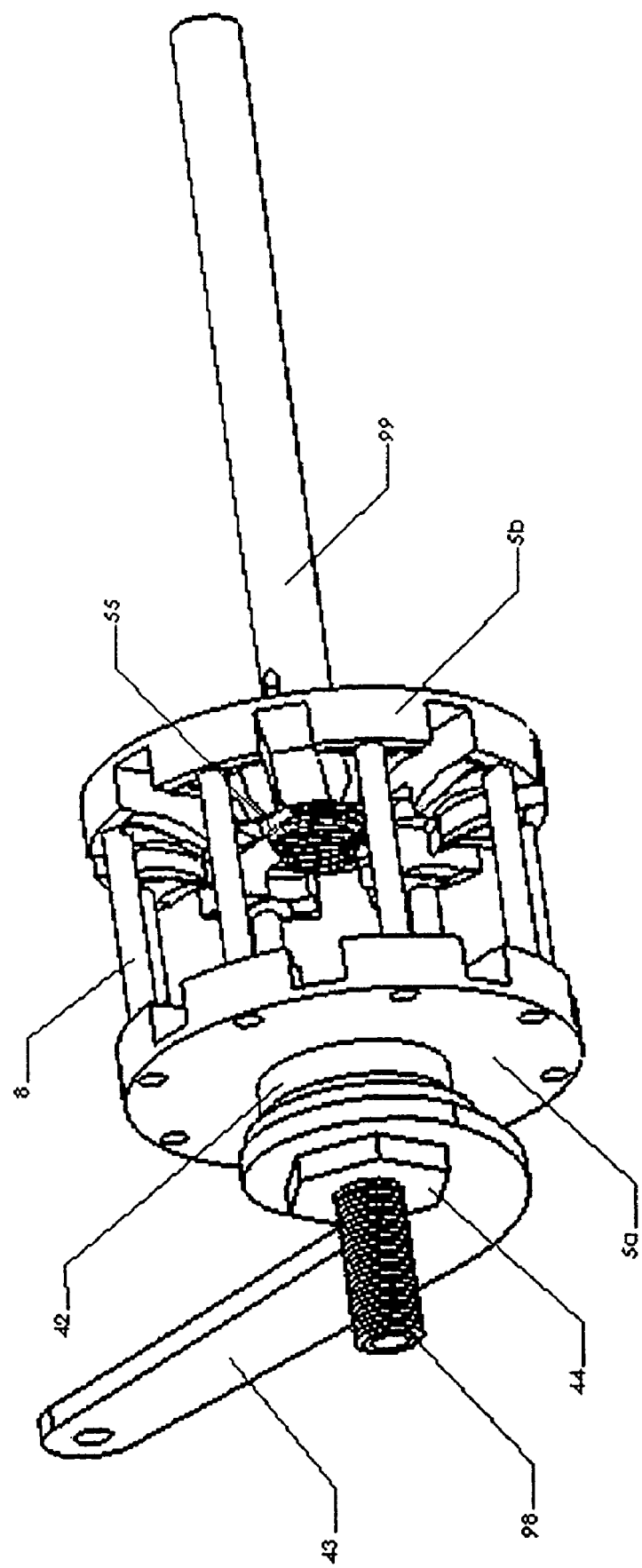
FIG. 3 is a perspective view of a split shaft and two stationary supports of the transmission of FIG. 1.

Referring to FIGS. 2, 3, and 11, a plurality of elongated spacers 8 are distributed radially about, and extend generally coaxially with, the axis of the transmission. The elongated spacers 8 connect the stationary supports 5a to one another to increase the strength and rigidity of the internal structure of the transmission 100. The spacers 8 are oriented generally parallel to one another, and in some embodiments, each one extends from a point at one stationary support 5a near the outer circumference to a corresponding point on the other stationary support 5b. The spacers 8 can also precisely fix the distance between the stationary supports 5a, 5b, align the grooves 6 of the stationary supports 5a, 5b, ensure that the stationary supports 5a, 5b are parallel, and form a connection between the split shafts 98, 99. In one embodiment, the spacers 8 are pressed through spacer holes 46 in the stationary supports 5a, 5b. Although eight spacers 8 are illustrated, more or less spacers 8 can be used. In certain embodiments, the spacers 8 are located between two speed adjusters 1.

Figure 13:
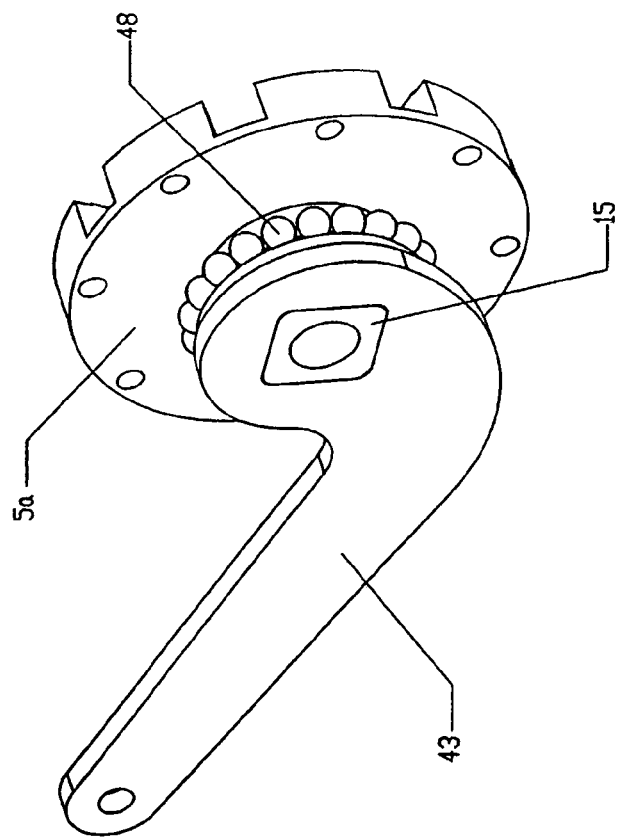
FIG. 13 is a schematic perspective view of the frame support of the transmission of FIG. 1.

Referring to FIGS. 1, 3, and 13, the stationary support 5a, in certain embodiments, is rigidly attached to a stationary support sleeve 42 located coaxially around the split shaft 98, or alternately, is otherwise rigidly attached to or made an integral part of the split shaft 98. The stationary sleeve 42 extends through the wall of the hub shell 40 and attaches to a frame support 15. In some embodiments, the frame support 15 fits coaxially over the stationary sleeve 42 and is rigidly attached to the stationary sleeve 42. The frame support 15 uses a torque lever 43, in some embodiments, to maintain the stationary position of the stationary sleeve 42. The torque lever 43 provides rotational stability to the transmission 100 by physically connecting the stationary sleeve 42, via the frame support 15, and therefore the rest of the stationary parts to a fixed support member of the item to which the transmission 100 is to be mounted. A torque nut 44 threads onto the outside of the stationary sleeve 42 to hold the torque lever 43 in a position that engages the frame support 15. In certain embodiments, the frame support 15 is not cylindrical so as to engage the torque lever 43 in a positive manner thereby preventing rotation of the stationary sleeve 42.

For example, the frame support 15 could be a square of thickness equal to the torque lever 43 with sides larger than the stationary sleeve and with a hole cut out of its center so that the square may fit over the stationary sleeve 42, to which it may then be rigidly attached. Additionally, the torque lever 43 could be a lever arm of thickness equal to that of the frame support 15 with a first end near the frame support 15 and a second end opposite the first. The torque lever 43, in some embodiments, also has a bore through one of its ends, but this bore is a square and is a slightly larger square than the frame support 15 so the torque lever 43 could slide over the frame support 15 resulting in a rotational engagement of the frame support 15 and the torque lever 43. Furthermore, the lever arm of the torque lever 43 is oriented so that the second end extends to attach to the frame of the bike, automobile, tractor or other application that the transmission 100 is used upon, thereby countering any torque applied by the transmission 100 through the frame support 15 and the stationary sleeve 42. A stationary support bearing 48 fits coaxially around the stationary sleeve 42 and axially between the outside edge of the hub shell 40 and the torque lever 43. The stationary support bearing 48 supports the hub shell 40, permitting the hub shell 40 to rotate relative to the stationary support sleeve 42.

Figure 10:
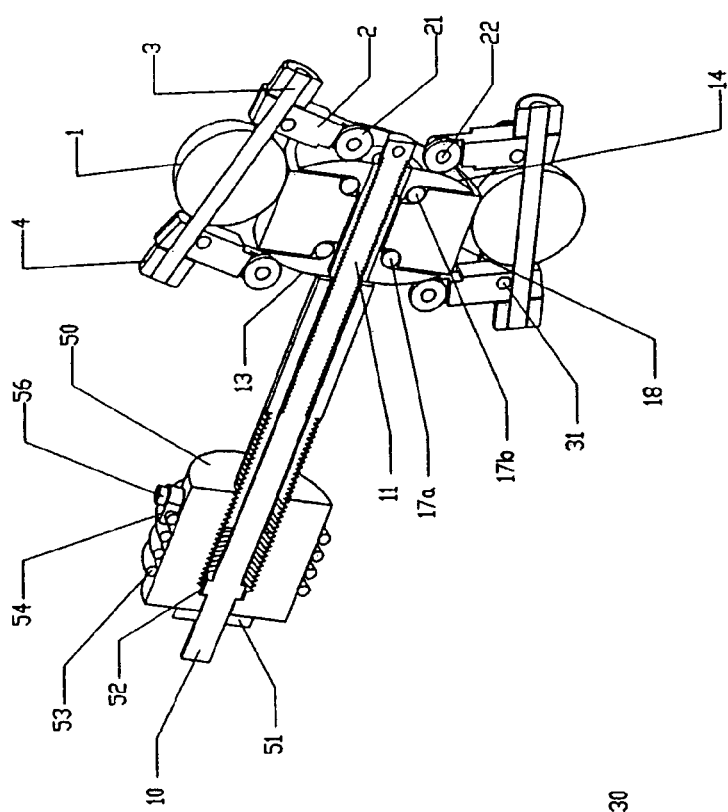
FIG. 10 is a cutaway perspective view of the shifting sub-assembly of the transmission of FIG. 1.
Figure 11:
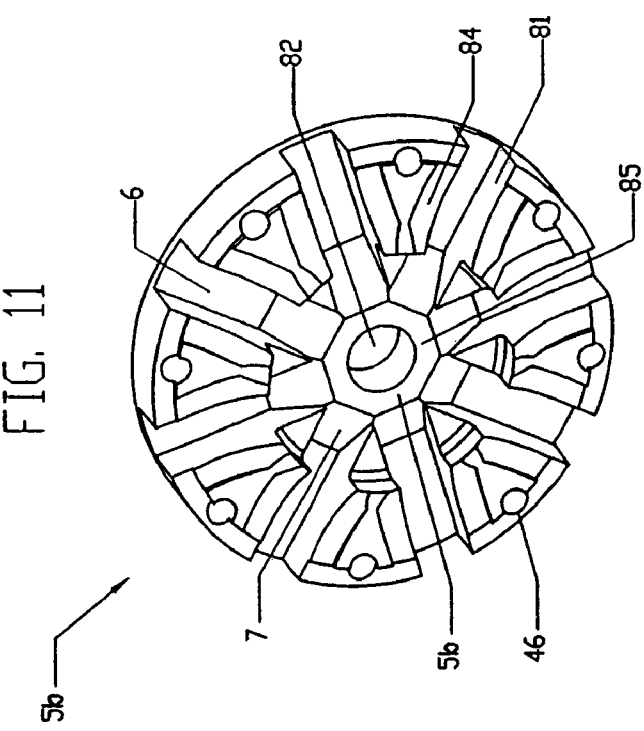
FIG. 11 is a perspective view of a stationary support of the transmission of FIG. 1.
Figure 14:
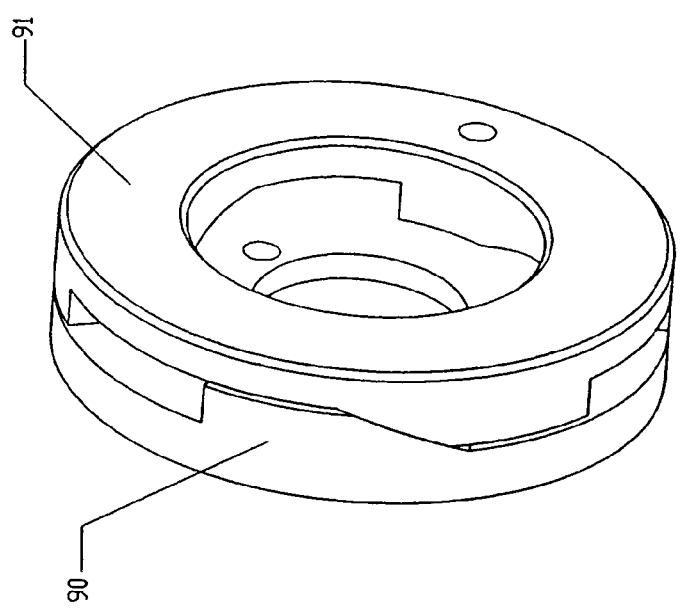
FIG. 14 is a partial cutaway perspective view of the central ramps of the transmission of FIG. 1.

Referring to FIGS. 1 and 10, in some embodiments, shifting is manually activated by rotating a rod 10, positioned in the hollow split shaft 98. A worm screw 11, a set of male threads in some embodiments, is attached to the end of the rod 10 that is in the center of the transmission 100, while the other end of the rod 10 extends axially to the outside of the transmission 100 and has male threads affixed to its outer surface. In one embodiment, the worm screw 11 is threaded into a coaxial sleeve 19 with mating threads, so that upon rotation of the rod 10 and worm screw 11, the sleeve 19 moves axially. The sleeve 19 is generally in the shape of a hollow cylinder that fits coaxially around the worm screw 11 and rod 10 and has two ends, one near stationary support 5a and one near stationary support 5b. The sleeve 19 is affixed at each end to a platform 13, 14. The two platforms 13, 14 are each generally of the form of an annular ring with an inside diameter, which is large enough to fit over and attach to the sleeve 19, and is shaped so as to have two sides. The first side is a generally straight surface that dynamically contacts and axially supports the support member 18 via two sets of contact bearings 17a, 17b. The second side of each platform 13, 14 is in the form of a convex surface. The platforms 13, 14 are each attached to one end of the outside of the sleeve 19 so as to form an annular trough around the circumference of the sleeve 19. One platform 13 is attached to the side nearest stationary support 5a and the other platform 14 is attached to the end nearest stationary support 5b. The convex surface of the platforms 13, 14 act as cams, each contacting and pushing multiple shifting wheels 21. To perform this camming function, the platforms 13, 14 preferably transition into convex curved surfaces 97 near their perimeters (farthest from the split shafts 98, 99), that may or may not be radii. This curve 97 contacts with the shifting wheels 21 so that as the platforms 13, 14 move axially, a shifting wheel 21 rides along the platform 13, 14 surface in a generally radial direction forcing the spindle support 2 radially out from, or in toward, the split shaft 98, 99, thereby changing the angle of the spindle 3 and the rotation axis of the associated speed adjuster 1. In certain embodiments, the shifting wheels 21 fit into slots in the spindle supports 2 at the end nearest the centerline of the transmission 100 and are held in place by wheel axles 22.

Still referring to FIGS. 1 and 10, a support member 18 is located in the trough formed between the platforms 13, 14 and sleeve 19, and thus moves in unison with the platforms 13, 14 and sleeve 19. In certain embodiments, the support member 18 is generally of one outside diameter and is generally cylindrical along the center of its inside diameter with a bearing race on each edge of its inside diameter. In other embodiments, the outer diameter of the support member 18 can be non-uniform and can be any shape, such as ramped or curved. The support member 18 has two sides, one near one of the stationary supports 5a and one near the other stationary support 5b. The support member 18 rides on two contact bearings 17a, 17b to provide rolling contact between the support member 18 and the sleeve 19. The contact bearings 17a, 17b are located coaxially around the sleeve 19 where the sleeve 19 intersects the platforms 13, 14 allowing the support member 18 to freely rotate about the axis of the transmission 100. The sleeve 19 is supported axially by the worm screw 11 and the rod 10 and therefore, through this configuration, the sleeve 19 is able to slide axially as the worm screw 11 positions it. When the transmission 100 is shifted, the sleeve 19 moves axially, and the bearings 17a, 17b, support member 18, and platforms 13, 14, which are all attached either dynamically or statically to the sleeve, move axially in a corresponding manner.

In certain embodiments, the rod 10 is attached at its end opposite the worm screw 11 to a shifting tube 50 by a rod nut 51, and a rod flange 52. The shifting tube 50 is generally in the shape of a tube with one end open and one end substantially closed. The open end of shifting tube 50 is of a diameter appropriate to fit over the end of the split shaft 98 that extends axially out of the center of the transmission 100. The substantially closed end of the shifting tube 50 has a small bore through it so that the end of the rod 10 that is opposite of the worm screw 11 can pass through it as the shifting tube 50 is placed over the outside of the split shaft 98. The substantially closed end of the shifting tube 50 can then be fixed in axial place by the rod nut 51, which is fastened outside of the shifting tube 50, and the rod flange 52, which in turn is fastened inside of the shifting tube's 50 substantially closed end, respectively. The shifting tube 50 can, in some embodiments, be rotated by a cable 53 attached to the outside of the shifting tube 50. The cable 53, in these embodiments, is attached to the shifting tube 50 with a cable clamp 54 and cable screw 56, and then wrapped around the shifting tube 50 so that when tension is applied to the cable 53 a moment is developed about the center of the axis of the shifting tube 50 causing it to rotate. The rotation of shifting tube 50 may alternately be caused by any other mechanism such as a rod, by hand rotation, a servo-motor or other method contemplated to rotate the rod 10. In certain embodiments, when the cable 53 is pulled so that the shifting tube 50 rotates clockwise on the split shaft 98, the worm screw 11 rotates clockwise, pulling the sleeve 19, support member 18 and platforms 13, 14, axially toward the shifting tube 50 and shifting the transmission 100 towards a low transmission ratio. A worm spring 55, as illustrated in FIG. 3, that can be a conical coiled spring capable of producing compressive and torsional force, attached at the end of the worm screw 11, is positioned between the stationary support 5b and the platform 14 and resists the shifting of the transmission 100. The worm spring 55 is designed to bias the shifting tube 50 to rotate so as to shift the transmission 100 towards a low transmission ratio in some embodiments and towards a high transmission ratio in other embodiments.

Referring to FIGS. 1, 10, and 11, axial movement of the platforms 13, 14, define the shifting range of the transmission 100. Axial movement is limited by inside faces 85 on the stationary supports 5a, 5b, which the platforms 13, 14 contact. At an extreme high transmission ratio, platform 14 contacts the inside face 85 on one of the stationary supports 5a, 5b, and at an extreme low transmission ratio, the platform 13 contacts the inside face 85 on the other one of the stationary supports 5a, 5b. In many embodiments, the curvature of the convex radii of the platforms 13, 14, are functionally dependant on the distance from the center of a speed adjuster 1 to the center of the wheel 21, the radius of the wheel 21, the distance between the two wheels 21 that are operably attached to each speed adjuster 1, and the angle of tilt of the speed adjuster 1 axis.

Although a left hand threaded worm screw 11 is disclosed, a right hand threaded worm screw 11, the corresponding right hand wrapped shifting tube 50, and any other combination of components just described that is can be used to support lateral movement of the support member 18 and platforms 13, 14, can be used. Additionally, the shifting tube 50 can have internal threads that engage with external threads on the outside of the split shaft 98. By adding this threaded engagement, the shifting tube 50 will move axially as it rotates about the split shaft 98 causing the rod 10 to move axially as well. This can be employed to enhance the axial movement of the sleeve 19 by the worm screw 11 so as to magnify the effects of rotating the worm screw 11 to more rapidly shift the gear ratio or alternatively, to diminish the effects of rotating the worm screw 11 so as to slow the shifting process and produce more accurate adjustments of the transmission 100.

Figure 18:
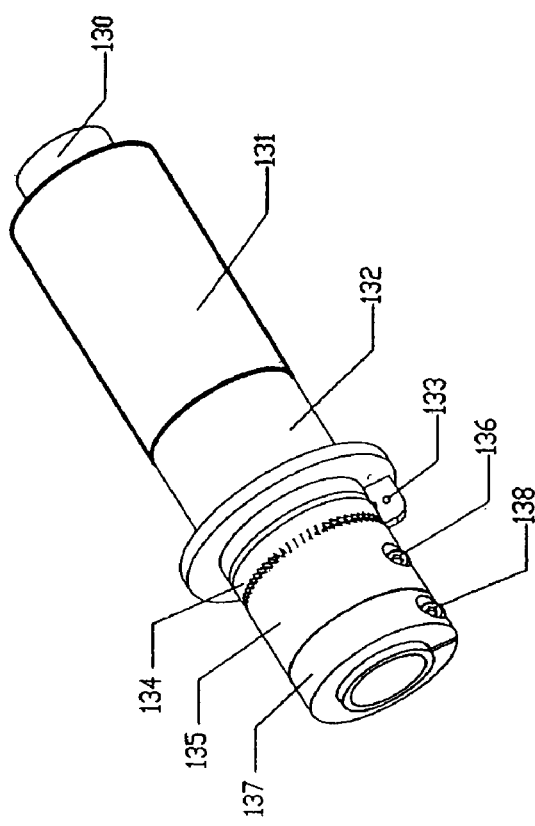
FIG. 18 is a perspective view of the handlegrip shifter of the transmission of FIG. 1.

Referring to FIGS. 10 and 18, manual shifting may be accomplished by use of a rotating handlegrip 132, which can be coaxially positioned over a stationary tube, a handlebar 130, or some other structural member. In certain embodiments, an end of the cable 53 is attached to a cable stop 133, which is affixed to the rotating handlegrip 132. In some embodiments, internal forces of the transmission 100 and the conical spring 55 tend to bias the shifting of the transmission towards a lower transmission ratio. As the rotating handlegrip 132 is rotated by the user, the cable 53, which can be wrapped along a groove around the rotating handlegrip 132, winds or unwinds depending upon the direction of rotation of the cable 53, simultaneously rotating the shifting tube 50 and shifting the transmission 100 towards a higher transmission ratio. A set of ratchet teeth 134 can be circumferentially positioned on one of the two sides of the rotating handlegrip 132 to engage a mating set of ratchet teeth on a first side of a ratcheted tube 135, thereby preventing the rotating handlegrip 132 from rotating in the opposite direction. A tube clamp 136, which can bean adjustable screw allowing for variable clamping force, secures the ratcheted tube 135 to the handlebar 130. When shifting in the opposite direction, the rotating handlegrip 132, is forcibly rotated in the opposite direction toward a lower transmission ratio, causing the tube clamp 136 to rotate in unison with the rotating handlegrip 132. A handlebar tube 137, positioned proximate to the ratcheted tube 135, on a side opposite the ratchet teeth 134, is rigidly clamped to the handlebar 130 with a tube clamp 138, thereby preventing disengagement of the ratcheted tube 135 from the ratchet teeth 134. A non-rotating handlegrip 131 is secured to the handlebar 130 and positioned proximate to the rotating handlegrip 132, preventing axial movement of the rotating handlegrip 132 and preventing the ratchet teeth 134 from becoming disengaged from the ratcheted tube 135.

Now referring to embodiments illustrated by FIGS. 1, 9, and 11, a one or more stationary support rollers 30 can be attached to each spindle support 2 with a roller pin 31 that is inserted through a hole in each spindle support 2. The roller pins 31 are of the proper size and design to allow the stationary support rollers 30 to rotate freely over each roller pin 31. The stationary support rollers 30 roll along concave curved surfaces 84 on the sides of the stationary supports 5a, 5b that face the speed adjusters 1. The stationary support rollers 30 provide axial support to prevent the spindle supports 2 from moving axially and also to ensure that the spindles 2 tilt easily when the transmission 100 is shifted.

Referring to FIGS. 1, 12, 14, and 17, a three spoked drive disk 34, located adjacent to the stationary support 5b, partially encapsulates but generally does not contact the stationary support 5b. The drive disk 34 may have two or more spokes or may be a solid disk. The spokes reduce weight and aid in assembly of the transmission 100 ine embodiments using them, however a solid disk can be used. The drive disk 34 has two sides, a first side that contacts with the speed adjusters 1, and a second side that faces opposite of the first side. The drive disk 34 is generally an annular disk that fits coaxially over, and extends radially from, a set of female threads or nut 37 at its inner diameter. The outside diameter of the drive disk 34 is designed to fit within the hub shell 40, if the hub shell 40 employed is the type that encapsulates the speed adjusters 1 and the drive disk 34, and engages with the hub cap 67. The drive disk 34 is rotatably coupled to the speed adjusters 1 along a circumferential bearing surface on the lip of the first side of the drive disk 34. As mentioned above, some embodiments of the drive disk 34 have a set of female threads 37, or a nut 37, at its center, and the nut 37 is threaded over a screw 35, thereby engaging the drive disk 34 with the screw 35. The screw 35 is rigidly attached to a set of central screw ramps 90 that are generally a set of raised surfaces on an annular disk that is positioned coaxially over the split shaft 99. The central screw ramps 90 are driven by a set of central drive shaft ramps 91, which are similarly formed on a generally annular disk. The ramp surfaces of the central drive ramps 91 and the central screw ramps 90 can be linear, but can be any other shape, and are in operable contact with each other. The central drive shaft ramps 91, coaxially and rigidly attached to the drive shaft 69, impart torque and an axial force to the central screw ramps 90 that can then be transferred to the drive disk 34. A central drive tension member 92, positioned between the central drive shaft ramps 91 and the central screw ramps 90, produces torsional and/or compressive force, ensuring that the central ramps 90, 91 are in contact with one another.

Still referring to FIGS. 1, 12, 14, and 17, the screw 35, which is capable of axial movement, can be biased to move axially away from the speed adjusters 1 with an annular thrust bearing 73 that contacts a race on the side of the screw 35 that faces the speed adjusters 1. An annular thrust washer 72, coaxially positioned over the split shaft 99, contacts the thrust bearing 73 and can be pushed by a pin 12 that extends through a slot in the split shaft 99. A compression member 95 capable of producing a compressive force is positioned in the bore of the hollow split shaft 99 at a first end. The compression member 95, which may be a spring, contacts the pin 12 on one end, and at a second end contacts the rod 10. As the rod 10 is shifted towards a higher transmission ratio and moves axially, it contacts the compression member 95, pushing it against the pin 12. Internal forces in the transmission 100 will bias the support member 18 to move towards a high transmission ratio position once the transmission ratio goes beyond a 1:1 transmission ratio towards high and the drive disk 34 rotates more slowly than the hub shell 40. This bias pushes the screw 35 axially so that it either disconnects from the nut 37 and no longer applies an axial force or a torque to the drive disk 34, or reduces the force that the screw 35 applies to the nut 37. In this situation, the percentage of axial force applied to the drive disk 34 by the perimeter ramps 61 increases. It should be noted that the internal forces of the transmission 100 will also bias the support member 18 towards low once the support member 18 passes beyond a position for a 1:1 transmission ratio towards low and the hub shell 40 rotates more slowly than the drive disk 34. This beneficial bias assists shifting as rpm's drop and torque increases when shifting into low.

Still referring to FIGS. 1, 12, 14, and 17, the drive shaft 69, which is a generally tubular sleeve having two ends and positioned coaxial to the outside of the split shaft 99, has at one end the aforementioned central drive shaft ramps 91 attached to it, while the opposite end faces away from the drive disk 34. In certain embodiments, a bearing disk 60 is attached to and driven by the drive shaft 69. The bearing disk 60 can be splined to the drive shaft 69, providing for limited axial movement of the bearing disk 60, or the bearing disk 60 can be rigidly attached to the drive shaft 69. The bearing disk 60 is generally a radial disk coaxially mounted over the drive shaft 69 extending radially outward to a radius generally equal to that of the drive disk 34. The bearing disk 60 is mounted on the drive shaft 69 in a position near the drive disk 34, but far enough away to allow space for a set of perimeter ramps 61, associated ramp bearings 62, and a bearing race 64, all of which are located between the drive disk 34 and the bearing disk 67. In certain embodiments, the plurality of perimeter ramps 61 can be concave and are rigidly attached to the bearing disk 60 on the side facing the drive disk 34. Alternatively, the perimeter ramps 61 can be convex or linear, depending on the use of the transmission 100. Alternatively, the bearing race 64, can be replaced by a second set of perimeter ramps 97, which may also be linear, convex, or concave, and which are rigidly attached to the drive disk 34 on the side facing the bearing disk 60. The ramp bearings 62 are generally a plurality of bearings matching in number the perimeter ramps 61. Each one of the plurality of ramp bearings 62 is located between one perimeter ramp 61 and the bearing race 64, and is held in its place by a compressive force exerted by the ramps 61 and also by a bearing cage 63. The bearing cage 63 is an annular ring coaxial to the split shaft 99 and located axially between the concave ramps 61 and convex ramps 64. The bearing cage 63 has a relatively large inner diameter so that the radial thickness of the bearing cage 63 is only slightly larger than the diameter of the ramp bearings 62 to house the ramp bearings 62. Each of the ramp bearings 62 fits into a hole that is formed in the radial thickness of the bearing cage 63 and these holes, together with the previously mentioned compressive force, hold the ramp bearings 62 in place. The bearing cage 63, can be guided into position by a flange on the drive disk 34 or the bearing disk 60, which is slightly smaller than the inside diameter of the bearing cage 63.

Figure 8:
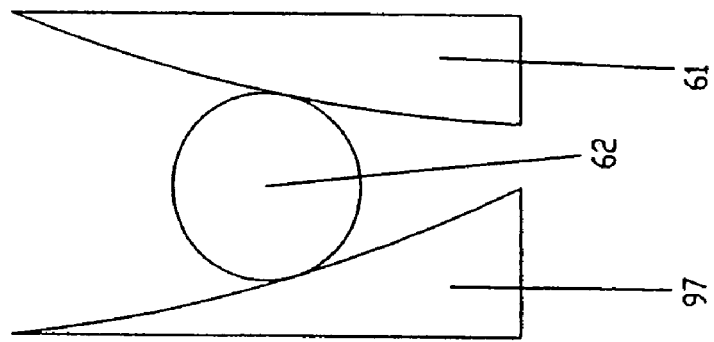
FIG. 8 is a schematic side view of a ramp bearing positioned between two curved ramps of the transmission of FIG. 1.
Figure 7:
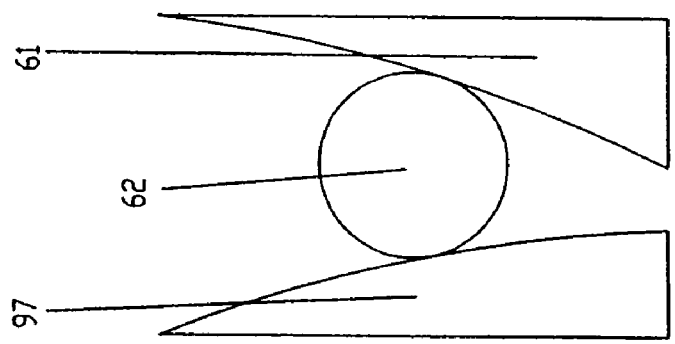
FIG. 7 is a schematic side view of a ramp bearing positioned between two curved ramps of the transmission of FIG. 1.
Figure 6:
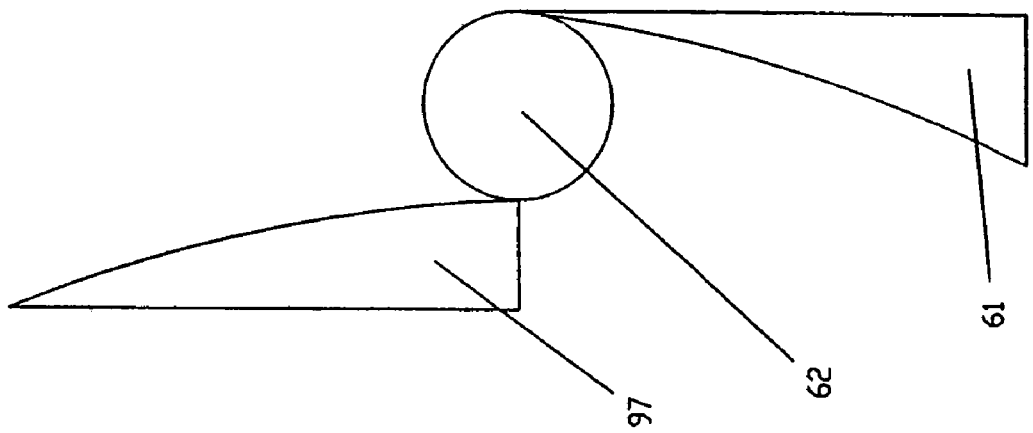
FIG. 6 is a schematic side view of a ramp bearing positioned between two curved ramps of the transmission of FIG. 1.

Referring to FIGS. 1, 6, 7, 8, and 15, the bearing disk 60, the perimeter ramps 61, and a ramp bearing 62 of one embodiment are depicted. Referring specifically to FIG. 6, a schematic view shows a ramp bearing 62 contacting a concave perimeter ramp 61, and a second convex perimeter ramp 97. Referring specifically to FIG. 7, a schematic view shows the ramp bearing 62, the concave perimeter ramp 61, and the second convex perimeter ramp 97 of FIG. 6 at a different torque or transmission ratio. The position of the ramp bearings 62 on the perimeter ramps 61 depicted in FIG. 7 produces less axial force than the position of the ramp bearings 62 on the perimeter ramps 61 depicted in FIG. 6. Referring specifically to FIG. 8, a ramp bearing 62 is shown contacting a convex perimeter ramp 61, and a concave second perimeter ramp 97 in substantially central positions on those respective ramps. It should be noted that changes in the curves of the perimeter ramps 61, 97 change the magnitude of the axial force applied to the power adjusters 1 at various transmission ratios, thereby maximizing efficiency in different gear ratios and changes in torque. Depending on the use for the transmission 100, many combinations of curved or linear perimeter ramps 61, 97 can be used. To simplify operation and reduce cost, in some applications one set of perimeter ramps may be eliminated, such as the second set of perimeter tramps 97, which are then replaced by a bearing race 64. To further reduce cost, the set of perimeter ramps 61 may have a linear inclination.

Referring to FIG. 1, a coiled spring 65 having two ends wraps coaxially around the drive shaft 69 and is attached at one end to the bearing disk 60 and at its other end to the drive disk 34. The coiled spring 65 provides force to keep the drive disk 34 in contact with the speed adjusters 1 and biases the ramp bearings 62 up the perimeter ramps 61. The coiled spring 65 is designed to minimize the axial space within which it needs to operate and, in certain embodiments, the cross section of the coiled spring 65 is a rectangle with the radial length greater than the axial length.

Referring to FIG. 1, the bearing disk 60 preferably contacts an outer hub cap bearing 66 on the bearing disk 60 side that faces opposite the concave ramps 61. The outer hub cap bearing 66 can be an annular set of roller bearings located radially outside of, but coaxial with, the centerline of the transmission 100. The outer hub cap bearing 66 is located radially at a position where it may contact both the hub cap 67 and the bearing disk 60 to allow their relative motion with respect to one another. The hub cap 67 is generally in the shape of a disk with a hole in the center to fit over the drive shaft 69 and with an outer diameter such that it will fit within the hub shell 40. The inner diameter of the hub cap engages with an inner hub cap bearing 96 that is positioned between the hub cap 67 and the drive shaft 69 and maintains the radial and axial alignment of the hub cap 67 and the drive shaft 69 with respect to one another. The edge of the hub cap 67 at its outer diameter can be threaded so that the hub cap 67 can be threaded into the hub shell 40 to encapsulate much of the transmission 100. A sprocket or pulley 38 or other drive train adapter, such as gearing for example, can be rigidly attached to the rotating drive shaft 69 to provide the input rotation. The drive shaft 69 is maintained in its coaxial position about the split shaft 99 by a cone bearing 70. The cone bearing 70 is an annular bearing mounted coaxially around the split shaft 99 and allows rolling contact between the drive shaft 69 and the split shaft 99. The cone bearing 70 may be secured in its axial place by a cone nut 71 which threads onto the split shaft 99 or by any other fastening method.

In operation of certain embodiments, an input rotation from the sprocket or pulley 38 is transmitted to the drive shaft 69, which in turn rotates the bearing disk 60 and the plurality of perimeter ramps 61 causing the ramp bearings 62 to roll up the perimeter ramps 61 and press the drive disk 34 against the speed adjusters 1. The ramp bearings 62 also transmit rotational energy to the drive disk 34 as they are wedged in between, and therefore transmit rotational energy between, the perimeter ramps 61 and the convex ramps 64. The rotational energy is transferred from the drive disk 34 to the speed adjusters 1, which in turn rotate the hub shell 40 providing the transmission 100 output rotation and torque.

Figure 16:
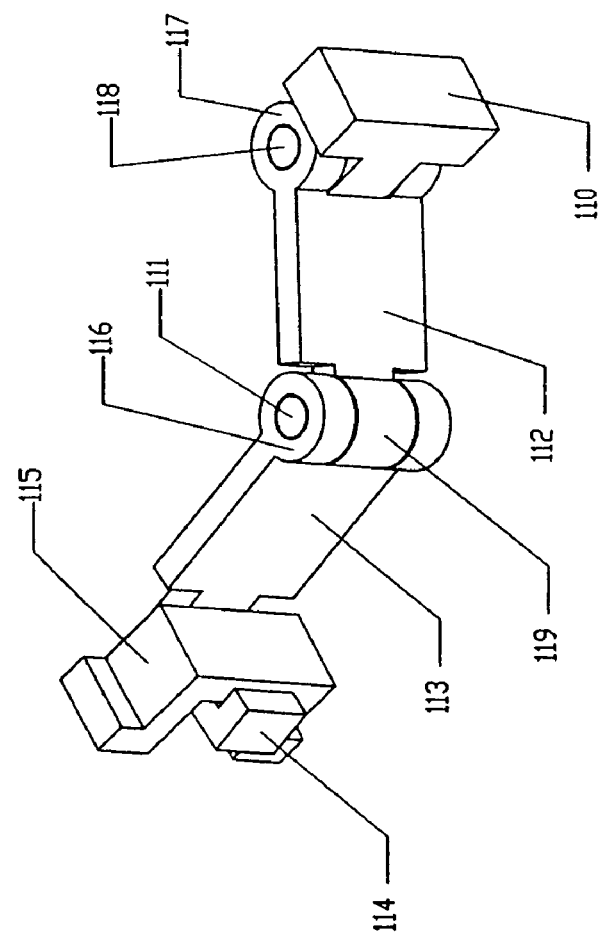
FIG. 16 is a perspective view of the linkage sub-assembly of the transmission of FIG. 1.
Figure 15:
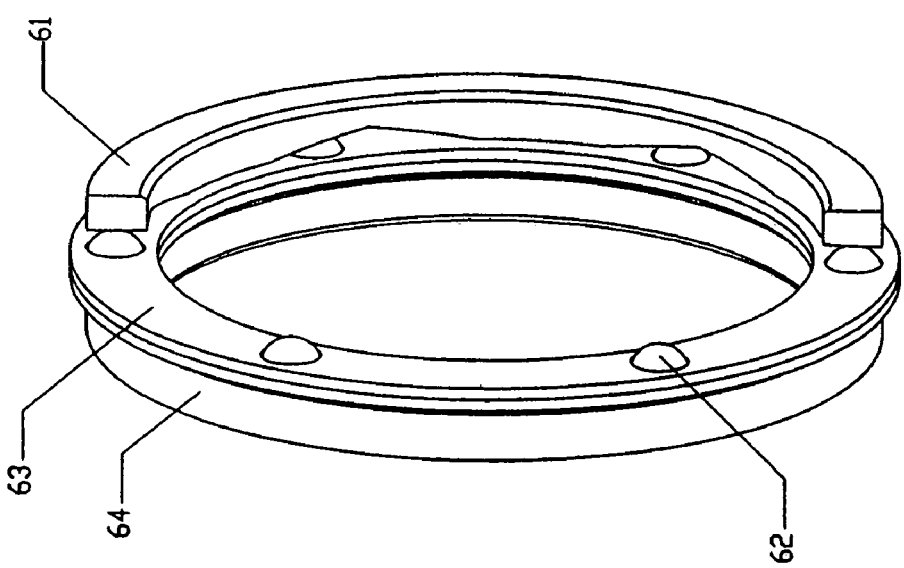
FIG. 15 is a perspective view of the perimeter ramps of the transmission of FIG. 1.

Referring to FIG. 16, a latch 115 rigidly attaches to the side of the drive disk 34 that faces the bearing disk 60 and engages a hook 114 that is rigidly attached to a first of two ends of a hook lever 113. The engaging area under the latch 115 opening is larger than the width of the hook 114 and provides extra room for the hook 114 to move radially, with respect to the axis, within the confines of the latch 114 when the drive disk 34 and the bearing disk 60 move relative to each other. The hook lever 113 is generally a longitudinal support member for the hook 114 and at its second end, the hook lever 113 has an integral hook hinge 116 that engages with a middle hinge 119 via a first hinge pin 111. The middle hinge 119 is integral with a first end of a drive disk lever 112, a generally elongated support member having two ends. On its second end, the drive disk lever 112 has an integral drive disk hinge 117, which engages a hinge brace 110 via the use of a second hinge pin 118. The hinge brace 110 is generally a base to support the hook 114, the hook lever 113, the hook hinge 116, the first hinge pin 111, the middle hinge 119, the drive disk lever 112 the second hinge pin 118, and the drive disk hinge 117, and it is rigidly attached to the bearing disk 60 on the side facing the drive disk 34. When the latch 73 and hook 72 are engaged the ramp bearings 62 are prevented from rolling to an area on the perimeter ramps 61 that does not provide the correct amount of axial force to the drive disk 34. This ensures that all rotational force applied to the ramp bearings 62 by perimeter ramps 61 is transmitted to the drive disk 34.

Figure 17:
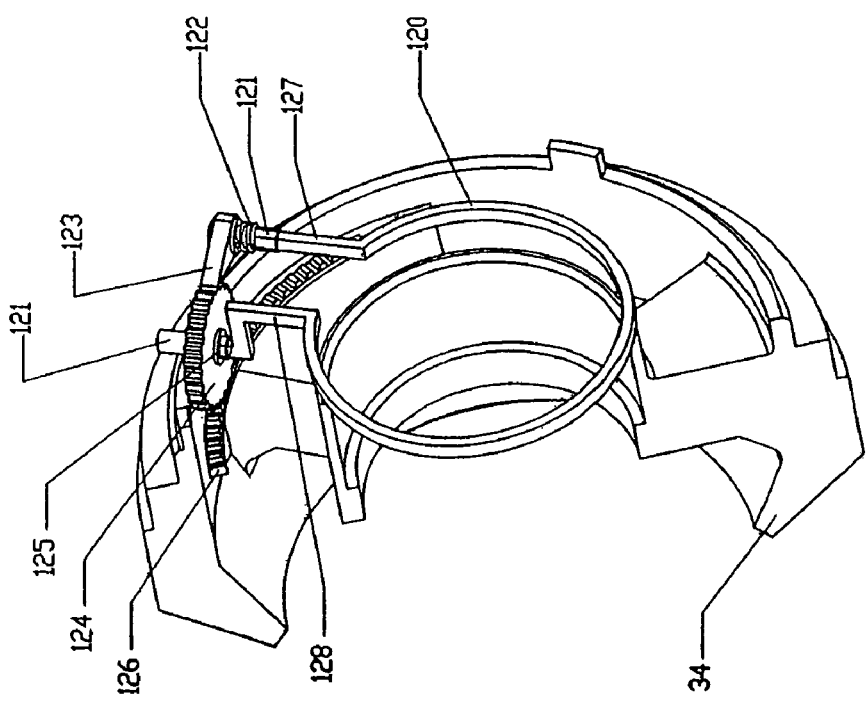
FIG. 17 is a perspective view of the disengagement mechanism sub-assembly of the transmission of FIG. 1.

Referring to FIGS. 1 and 17, a disengagement mechanism for one embodiment of the transmission 100 is described to disengage the drive disk 34 from the speed adjusters 1 in order to coast. On occasions that input rotation to the transmission 100 ceases, the sprocket or pulley 38 stops rotating but the hub shell 40 and the speed adjusters 1 can continue to rotate. This causes the drive disk 34 to rotate so that the set of female threads 37 in the bore of the drive disk 34 wind onto the male threaded screw 35, thereby moving the drive disk 34 axially away from the speed adjusters 1 until the drive disk 34 no longer contacts the speed adjusters 1. A toothed rack 126, rigidly attached to the drive disk 34 on the side facing the bearing disk 60, has teeth that engage and rotate a toothed wheel 124 as the drive disk 34 winds onto the screw 35 and disengages from the power adjusters 1. The toothed wheel 124, has a bore in its center, through which a toothed wheel bushing 121 is located, providing for rotation of the toothed wheel 124. Clips 125 that are coaxially attached over the toothed wheel bushing 121 secure the toothed wheel 124 in position, although any means of fastening may be used. A preloader 120, coaxially positioned over and clamped to the central drive shaft ramps 91, extends in a direction that is radially outward from the center of the transmission 100. The preloader 120, of a resilient material capable of returning to its original shape when flexed, has a first end 128 and a second end 127. The first end of the preloader 128 extends through the toothed wheel bushing 121 and terminates in the bearing cage 63. The first end of the preloader 128 biases the bearing cage 63 and ramp bearings 62 up the ramps 61, ensuring contact between the ramp bearings 62 and the ramps 61, and also biases the toothed wheel 124 against the toothed rack 126. A pawl 123, engages the toothed wheel 124, and in one embodiment engages the toothed wheel 124 on a side substantially opposite the toothed rack 126. The pawl 123 has a bore through which a pawl bushing 122 passes, allowing for rotation of the pawl 123. Clips 125, or other fastening means secure the pawl 123 to the pawl bushing 121. A pawl spring 122 biases rotation of the pawl 123 to engage the toothed wheel 124, thereby preventing the toothed wheel 124 from reversing its direction of rotation when the drive disk 34 winds onto the screw 35. The pawl bushing 121 is positioned over a second end of the preloader 127, which rotates in unison with the drive shaft 69.

Referring again to FIG. 1, a coiled spring 65, coaxial with and located around the drive shaft 69, is located axially between and attached by pins or other fasteners (not shown) to both the bearing disk 60 at one end and drive disk 34 at the other end. In certain embodiments, the coiled spring 65 replaces the coiled spring of the prior art so as to provide more force and take less axial space in order to decrease the overall size of the transmission 100. In some embodiments, the coiled spring 65 is produced from spring steel wire with a rectangular profile that has a radial length or height greater than its axial length or width. During operation of the transmission 100, the coiled spring 65 ensures contact between the speed adjusters 1 and the drive disk 34. However, once the drive disk 34 has disengaged from the speed adjusters 1, the coiled spring 65 is prevented from winding the drive disk 34 so that it again contacts the speed adjusters 1 by the engagement of the toothed wheel 124 and the pawl 123. When the input sprocket, gear, or pulley 38, resumes its rotation, the pawl 123 also rotates, allowing the toothed wheel 124 to rotate, thus allowing the drive disk 34 to rotate and unwind from the screw 35 due to the torsional force created by the coiled spring 65. Relative movement between the pawl 123 and the toothed wheel 124 is provided by the fact that the first end of the preloader 128 rotates at approximately half the speed as the second end of the preloader 127 because the first end of the preloader 128 is attached to the bearing cage 63. Also, because the ramp bearings 62 are rolling on the perimeter ramps 61 of the bearing disk 60, the bearing cage 63 will rotate at half the speed as the bearing disk 60.

Figure 19:
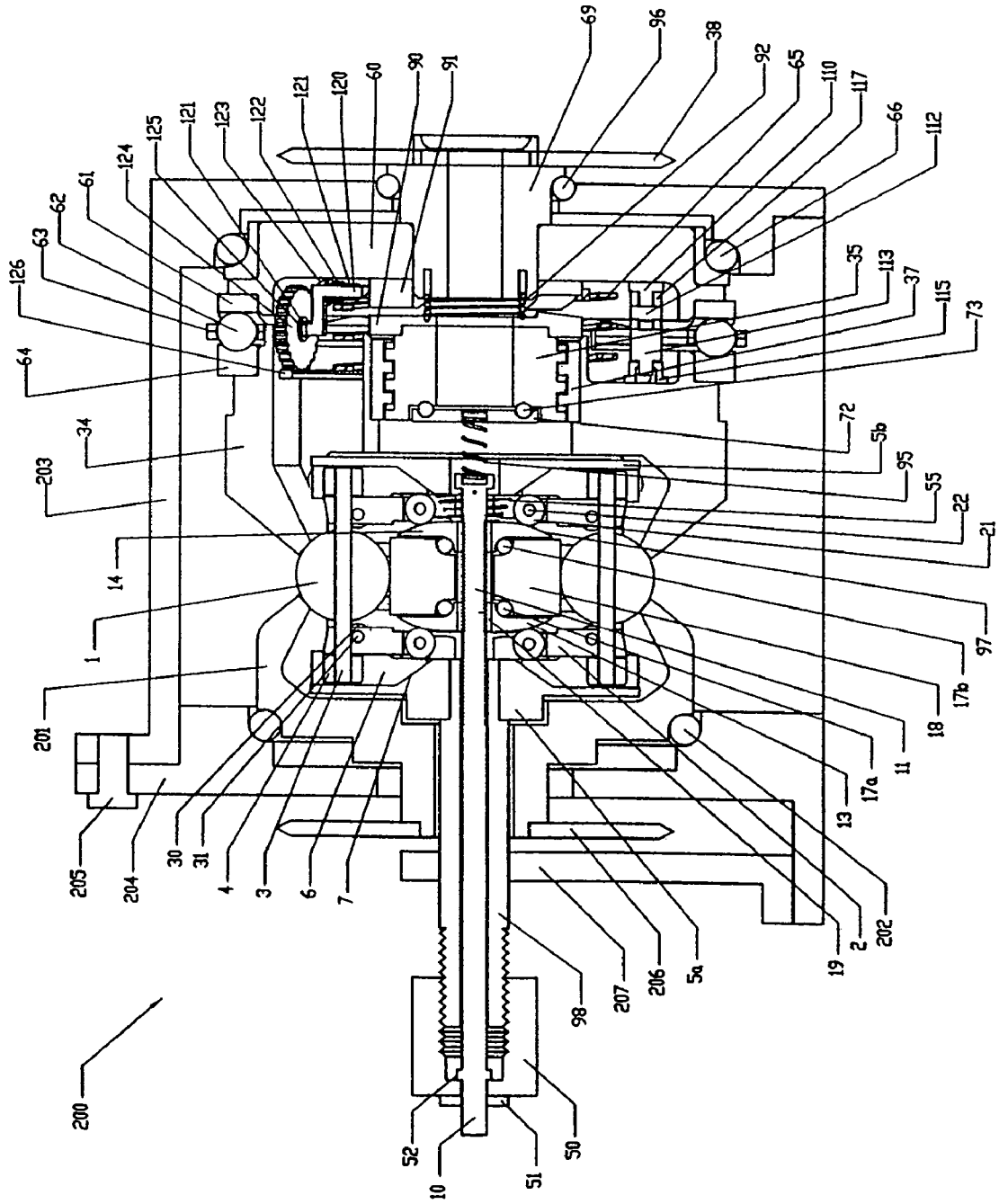
FIG. 19 is a cutaway side view of an alternative embodiment of the transmission of FIG. 1.

Referring now to FIG. 19, an alternative embodiment of the transmission 100 of FIG. 1 is disclosed. In this embodiment, an output disk 201 replaces the hub shell 40 of the transmission 100 illustrated in FIG. 1. Similar to the drive disk 34, the output disk 201 contacts, and is rotated by, the speed adjusters 1. The output disk 201 is supported by an output disk bearing 202 that contacts both the output disk 201 and a stationary case cap 204. The case cap 204 is rigidly attached to a stationary case 203 with case bolts 205 or any other fasteners. The stationary case 203 can be attached to a non-moving object such as a frame or to the machine for which its use is employed. A gear, sprocket, or pulley 206 is attached coaxially over and rigidly to the output disk 201 outside of the case cap 204 and stationary case 203. Any other type of output means can be used however, such as gears for example. A torsional brace 207 can be added that rigidly connects the split shaft 98 to the case cap 204 for additional support.

Figure 20:
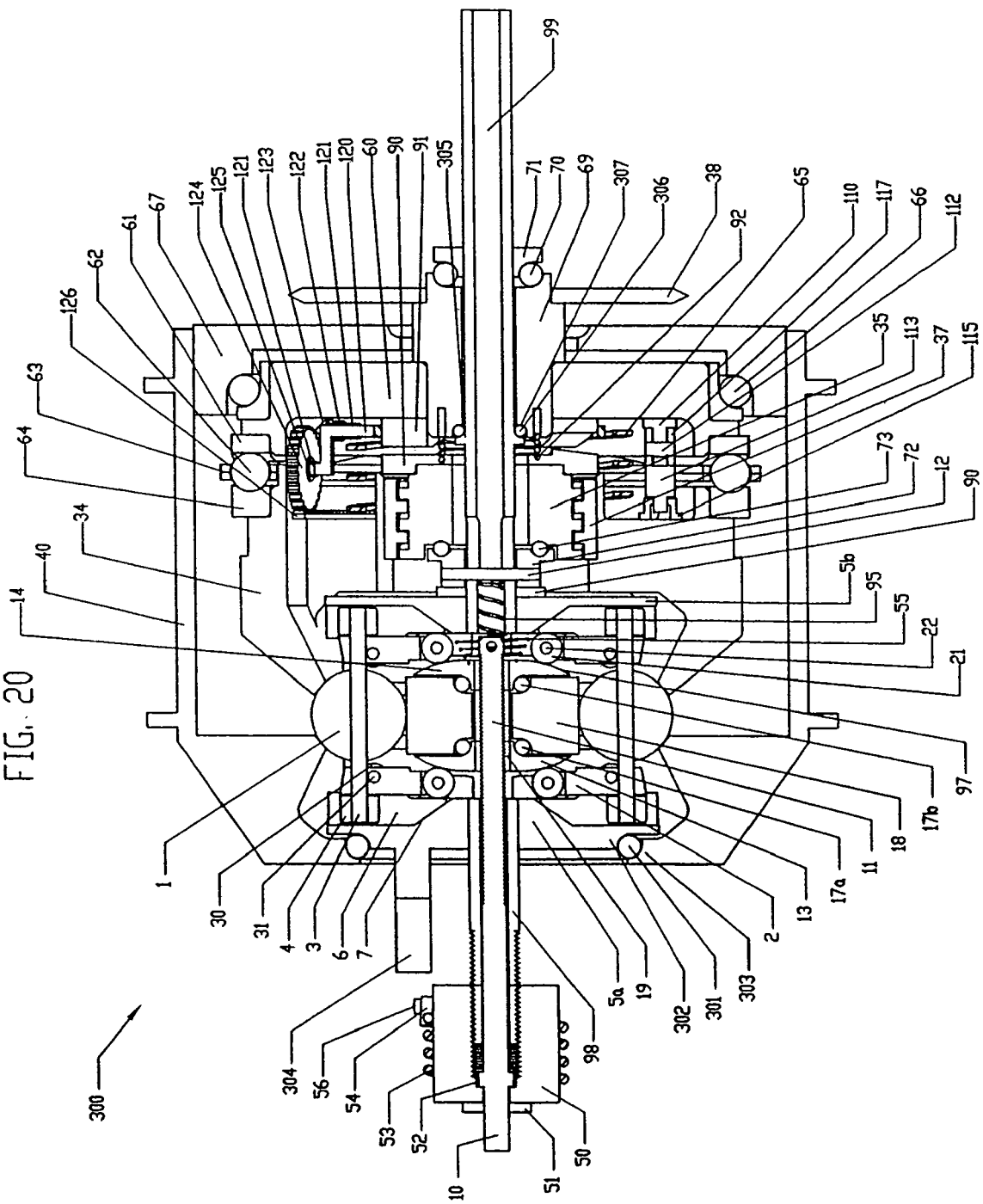
FIG. 20 is a cutaway side view of yet another alternative embodiment of the transmission of FIG. 1.
Figure 21:
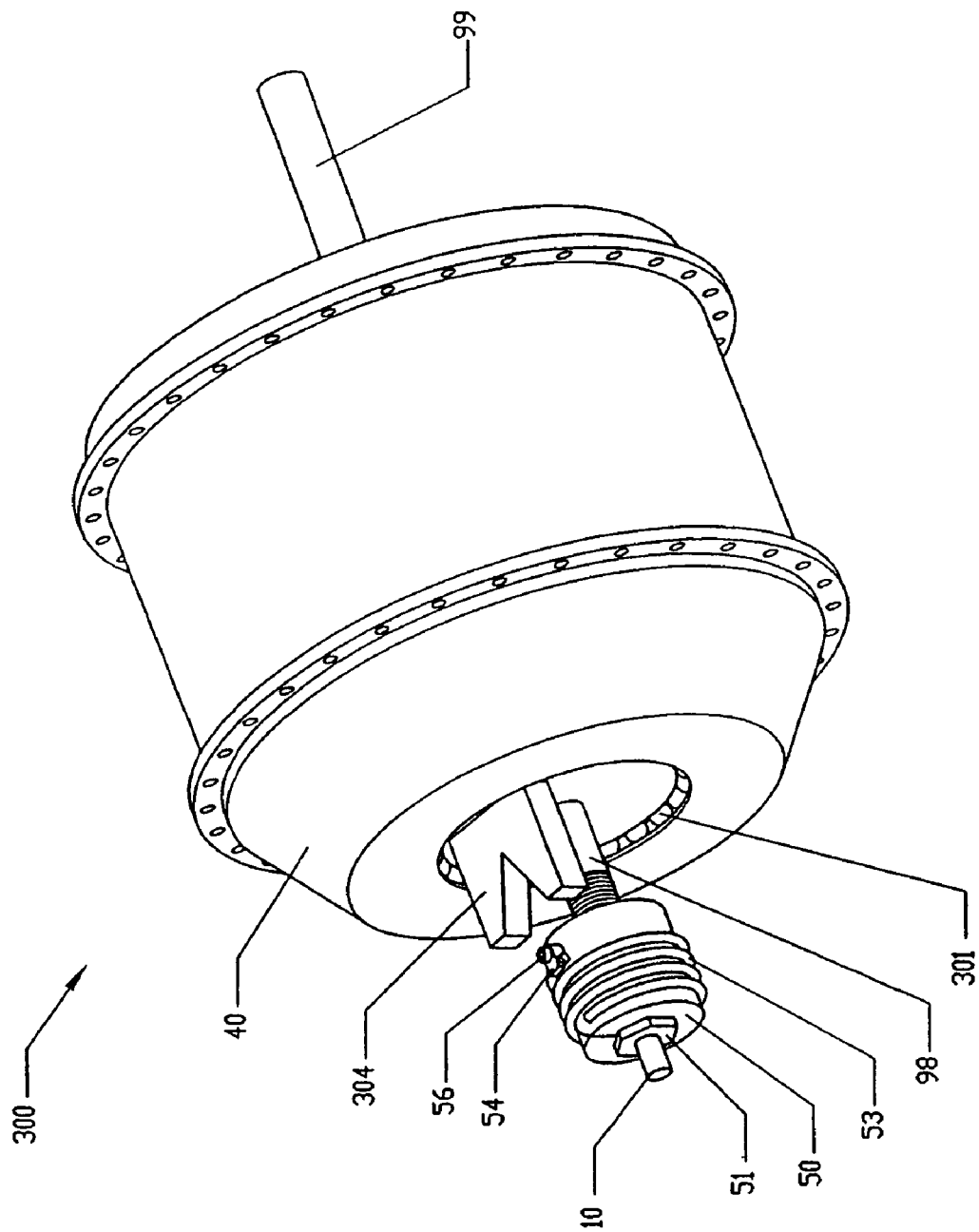
FIG. 21 is a perspective view of the transmission of FIG. 20 depicting a torsional brace.

Referring now to FIGS. 20 and 21, an alternative embodiment of the transmission 100 of FIG. 1 is disclosed. A stationary support race 302 is added on a side of stationary support 5a facing away from the speed adjusters 1 and engages with a stationary support bearing 301 and a rotating hub shell race 303 to maintain correct alignment of the stationary support 5a with respect to the rotating hub shell 40. A torsional brace 304 is rigidly attached to the stationary support 5a and can then be rigidly attached to a stationary external component to prevent the stationary supports 5a, 5b from rotating during operation of the transmission 300. A drive shaft bearing 306 is positioned at an end of the drive shaft 69 facing the speed adjusters 1 and engages a drive shaft race 307 formed in the same end of the drive shaft 69 and a split shaft race 305 formed on a radially raised portion of the split shaft 99 to provide additional support to the drive shaft 69 and to properly position the drive shaft 69 relative to the stationary supports 5a, 5b.

Referring now to FIGS. 22 and 23, an alternative disengagement mechanism 400 of the transmission 100 of FIG. 1 is disclosed. A toothed wheel 402 is coaxially positioned over a wheel bushing 408 and secured in position with a clip 413 or other fastener such that it is capable of rotation. The wheel bushing 408 is coaxially positioned over the first end of a preloader 405 having first and second ends (both not separately identified in FIGS. 22, and 23). The preloader 405 clamps resiliently around the central drive shaft ramps 91. The first end of the preloader 405 extends into the bearing cage 63, biasing the bearing cage 63 up the perimeter ramps 61. Also positioned over the wheel bushing 408 is a lever 401 that rotates around the wheel bushing 408 and that supports a toothed wheel pawl 411 and a pinion pawl 409. The toothed wheel pawl 411 engages the toothed wheel 402 to control its rotation, and is positioned over a toothed wheel bushing 414 that is pressed into a bore in the lever 401. A toothed wheel pawl spring 412 biases the toothed wheel pawl 411 against the toothed wheel 402. The pinion pawl 409, positioned substantially opposite the toothed wheel pawl 411 on the lever 401, is coaxially positioned over a pinion pawl bushing 415 that fits into another bore in the lever 401 and provides for rotational movement of the pinion pawl 409. A pinion pawl spring 410 biases the pinion pawl 409 against a pinion 403.

Referring now to FIGS. 1, 22 and 23, the pinion 403 has a bore at its center and is coaxially positioned over a first of two ends of a rod lever 404. The rod lever is an elongated lever that engages the pinion pawl 409 during coasting until input rotation of the sprocket, pulley, or gear 38 resumes. A bearing disk pin 406 that is affixed to the bearing disk 60 contacts a second end of the rod lever 404, upon rotation of the bearing disk 60, thereby pushing the rod lever 404 against a drive disk pin 407, which is rigidly attached to the drive disk 34. This action forces the first end of the rod lever 404 to swing away from the toothed wheel 402, temporarily disconnecting the pinion 403 from the toothed wheel 402, allowing the toothed wheel 402 to rotate. A lever hook 401 is attached to the the lever 401 and contacts a latch (not shown) on the drive disk 34 and is thereby pushed back as the coiled spring 65 biases the drive disk 34 to unwind and contact the speed adjusters 1. During occasions that the input rotation of the sprocket, pulley, or gear 38 ceases, and the speed adjusters 1 continue to rotate, the drive disk 34 winds onto the screw 35 and disengages from the speed adjusters 1. As the drive disk 34 rotates, the drive disk pin 407 disengages from the rod lever 404, which then swings the pinion 403 into contact with the toothed wheel 402, preventing the drive disk 34 from re-engaging the speed adjusters 1.

Figure 24:
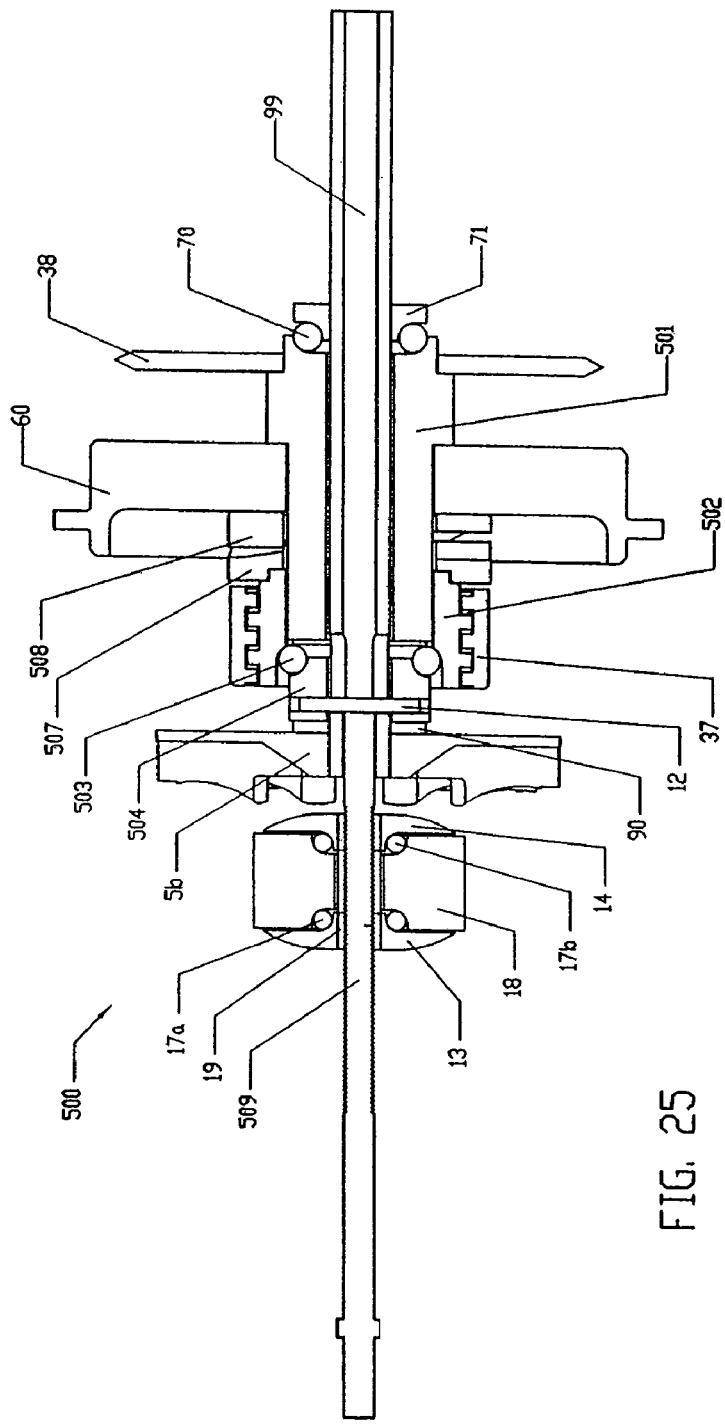
FIG. 24 is a view of a sub-assembly of an alternative embodiment of the axial force generators of the transmission of FIG. 20.
Figure 25:
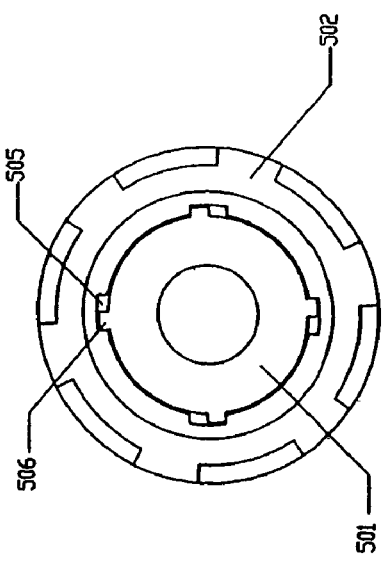
FIG. 25 is a schematic cross sectional view of the splines and grooves of the axial force generators of FIG. 24.
Figure 27:
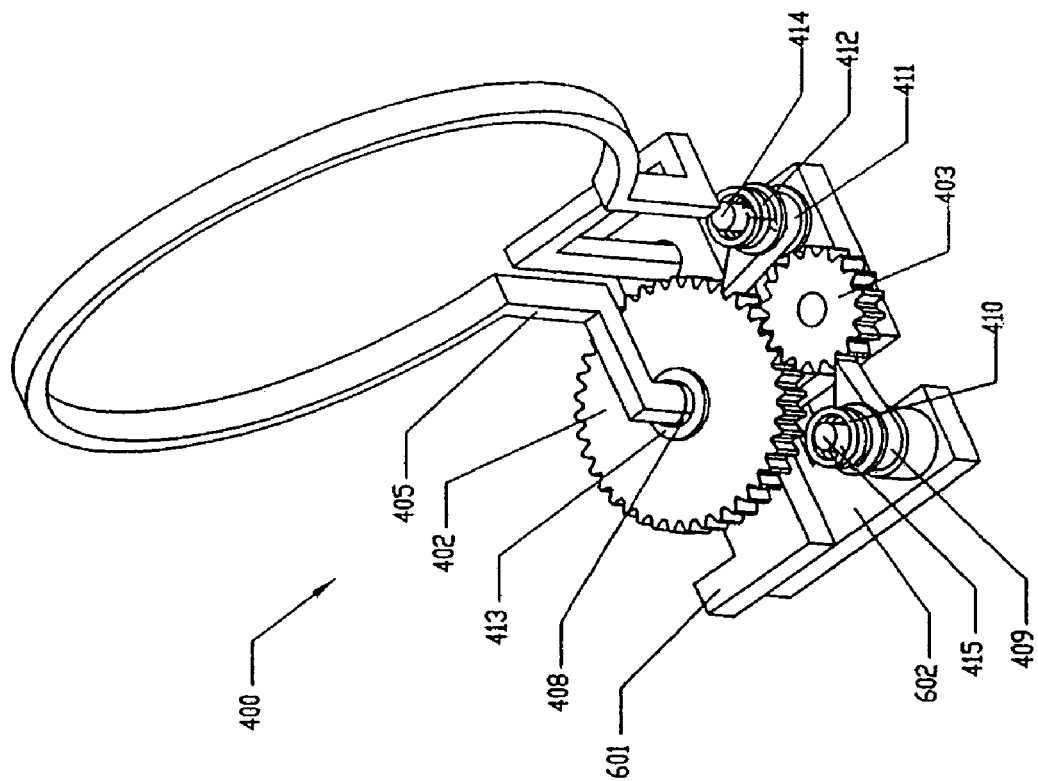
FIG. 27 is a perspective view of the alternative disengagement mechanism of FIG. 26.

Referring to FIGS. 24 and 25, a sub-assembly of an alternative set of axial force generators 500 of the transmission 300 of FIG. 20 is disclosed. When rotated by the input sprocket, gear, or pulley 38, a splined drive shaft 501 rotates the bearing disk 60, which may have grooves 505 in its bore to accept and engage the splines 506 of the splined drive shaft 501. The central drive shaft ramps 508 are rigidly attached to the bearing disk 60 or the splined drive shaft 501 and rotate the central screw ramps 507, both of which have bores that clear the splines 506 of the splined drive shaft 501. The central tension member 92 (illustrated in FIG. 1) is positioned between the central drive shaft ramps 508 and the central screw ramps 507. A grooved screw 502 having a grooved end and a bearing end is rotated by the central screw ramps 90 and has grooves 505 on its bearing end that are wider than the splines 506 on the splined drive shaft 501 to provide a gap between the splines 506 and the grooves 505. This gap between the splines 506 and the grooves 505 allows for relative movement between the grooved screw 502 and/or bearing disk 60 and the splined drive shaft 501. On occasions when the grooved screw 502 is not rotated by the central drive shaft ramps 508 and the central screw ramps 507, the splines 506 of the splined drive shaft 501 contact and rotate the grooves 505 on the grooved screw 502, thus rotating the grooved screw 502. An annular screw bearing 503 contacts a race on the bearing end of the grooved screw 502 and is positioned to support the grooved screw 502 and the splined drive shaft 501 relative to the axis of the split shaft 99. The bore of the grooved screw 502 is slightly larger than the outside diameter of the splined drive shaft 501 to allow axial and rotational relative movement of the grooved screw 502. A screw cone race 504 contacts and engages the annular screw bearing 503 and has a hole perpendicular to its axis to allow insertion of a pin 12. The pin 12 engages the rod 10, which can push on the pin 12 and move the grooved screw 502 axially, causing it to disengage from, or reduce the axial force that it applies to, the nut 37.

Figure 26:
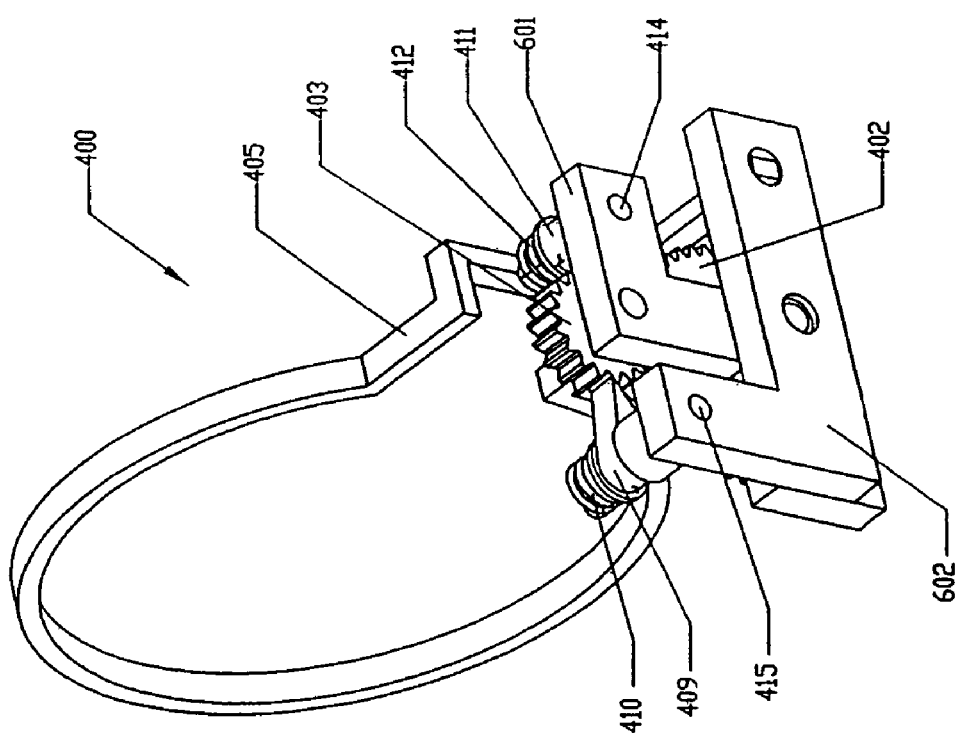
FIG. 26 is a perspective view of an alternative disengagement mechanism of the transmission of FIG. 1.

Referring to FIG. 26, an alternative disengagement means 600 of the disengagement means 400 of FIGS. 22 and 23 is disclosed. The lever 401 is modified to eliminate the T-shape used to mount both the pinion pawl 409 and the toothed wheel pawl 411 so that the new lever 601 has only the toothed wheel pawl 411 attached to it. A second lever 602, having a first end and a second end. The pinion pawl 409 is operably attached to the first end of the second lever 602. The second lever 602 has a first bore through which the first end of the preloader 405 is inserted. The second lever 602 is rotatably mounted over the first end of the preloader 405. The second lever 602 has a second bore in its second end through which the second end of the preloader 603 is inserted. When rotation of the sprocket, gear, or pulley 38 ceases, the drive disk 34 continues to rotate forward and wind onto the screw 36 until it disengages from the speed adjusters 1. The first end of the preloader 405 rotates forward causing the pinion pawl 409 to contact and rotate the pinion 403 clockwise. This causes the toothed wheel 402 to rotate counter-clockwise so that the toothed wheel pawl 411 passes over one or more teeth of the toothed wheel 402, securing the drive disk 34 and preventing it from unwinding off of the screw 36 and contacting the speed adjusters 1. When rotation of the sprocket, gear, or pulley 38 resumes, the second end of the preloader 603 rotates, contacting the second end of the second lever 602 causing the pinion pawl 409 to swing out and disengage from the pinion 403, thereby allowing the drive disk 34 to unwind and reengage with the speed adjusters 1.

With this description in place, some of the particular improvements and advantages of the present invention will now be described. Note that not all of these improvements are necessarily found in all embodiments of the invention.

Referring to FIG. 1, a current improvement in some embodiments includes providing variable axial force to the drive disk 34 to respond to differing loads or uses. This can be accomplished by the use of multiple axial force generators. Axial force production can switch between a screw 35 and a nut 37, with associated central drive shaft ramps 91 and screw ramps 90, to perimeter ramps 61, 64. Or the screw 35, central ramps 90, 91, and perimeter ramps 61, 64 can share axial force production. Furthermore, axial force at the perimeter ramps 61, 64 can be variable. This can be accomplished by the use of ramps of variable inclination and declination, including concave and convex ramps. Referring to FIG. 1 and FIGS. 6–8 and the previous detailed description, an embodiment is disclosed where affixed to the bearing disk 60 is a first set of perimeter ramps 61, which may be concave, with which the ramp bearings 62 contact. Opposite the first set of perimeter ramps 61 are a second set of perimeter ramps 97 that are attached to the drive disk 34, which may be convex, and which are in contact with the ramp bearings 62. The use of concave and convex ramps to contact the ramp bearings 62 allows for non-linear increase or decrease in the axial load upon the drive disk 34 in response to adjustments in the position of the speed adjusters 1 and the support member 18.

Another improvement of certain embodiments includes positively engaging the bearing disk 60 and the drive disk 34 to provide greater rotational transmission and constant axial thrust at certain levels of torque transmission. Referring to an embodiment illustrated in FIG. 1 as described above, this may be accomplished, for example, by the use of the hook 114 and latch 115 combination where the hook 114 is attached to the bearing cage 63 that houses the ramp bearings 62 between the drive disk 34 and the bearing disk 60, and the latch 115 is attached to the drive disk 34 that engages with the hook 114 when the ramp bearings 62 reach their respective limit positions on the ramp faces. Although such configuration is provided for example, it should be understood that the hook 114 and the latch 115 may be attached to the opposite component described above or that many other mechanisms may be employed to achieve such positive engagement of the bearing disk 60 and the drive disk 34 at limiting positions of the ramp bearings 62.

A further improvement of certain embodiments over previous designs is a drive disk 34 having radial spokes (not separately identified), reducing weight and aiding in assembly of the transmission 100. In a certain embodiment, the drive disk 34 has three spokes equidistant from each other that allow access to, among other components, the hook 114 and the latch 115.

Another improvement of certain embodiments includes the use of threads 35, such as acme threads, to move the drive disk 34 axially when there is relative rotational movement between the drive disk 34 and the bearing disk 60. Referring to the embodiment illustrated in FIG. 1, a threaded male screw 35 may be threaded into a set of female threads 37, or a nut 37, in the bore of the drive disk 34. This allows the drive disk 34 to disengage from the speed adjusters 1 when the drive disk 34 ceases to provide input torque, such as when coasting or rolling in neutral, and also facilitates providing more or less axial force against the speed adjusters 1. Furthermore, the threaded male screw 35 is also designed to transmit an axial force to the drive disk 34 via the set of female threads 37.

Yet another improvement of certain embodiments over past inventions consists of an improved method of shifting the transmission to higher or lower transmission ratios. Again, referring to the embodiment illustrated in FIG. 1, this method can be accomplished by using a threaded rod 10, including, for example, a left hand threaded worm screw 11 and a corresponding right hand threaded shifting tube 50, or sleeve, that operates remotely by a cable 53 or remote motor or other remote means. Alternatively, left-handed threads can be used for both the worm screw 11 and the shifting tube, or a non-threaded shifting tube 50 could be used, and any combinations thereof can also be used as appropriate to affect the rate of shifting the transmission 100 with respect to the rate of rotation of the shifting tube 50. Additionally, a conical spring 55 can be employed to assist the operator in maintaining the appropriate shifting tube 50 position. The worm screw 11 is preferably mated with a threaded sleeve 19 so as to axially align the support member 18 so that when the worm screw 11 is rotated the support member 18 will move axially.

Another improvement of some embodiments over past inventions is the disengagement mechanism for the transmission 100. The disengagement mechanism allows the input sprocket, pulley, or gear 38 to rotate in reverse, and also allows the transmission 100 to coast in neutral by disengaging the drive disk 34 from the speed adjusters 1.

Figure 28:
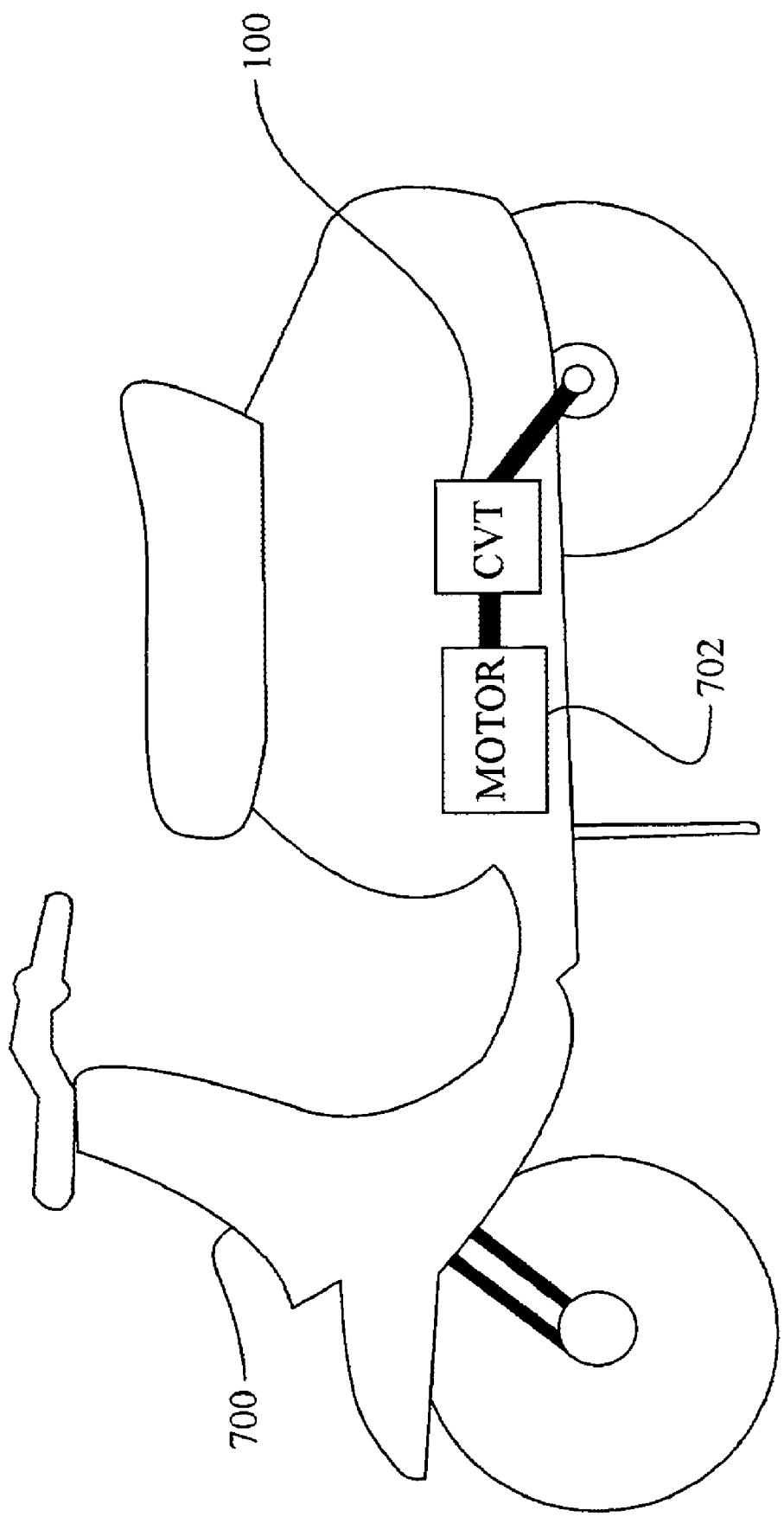
FIG. 28 is a schematic illustration of a transmission as embodied in a scooter application.

FIG. 28 illustrates one embodiment including a scooter 700 in which the transmission 100 of FIG. 1 is coupled to a motor 702 of the scooter 700. In one embodiment, the motor 702 is coupled to the transmission 100 via the sprocket or pulley 38 of FIG. 1 or another suitable drive train adapter, such as gearing for example.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A scooter comprising:
   a motor of the scooter;
   a continuously variable transmission coupled to the power source motor, the continuously variable transmission comprising:
      a plurality of speed adjusters;
      a drive disk frictionally contacting the speed adjusters;
      a driven disk frictionally contacting the speed adjusters;

a support member between the drive disk and the driven disk and frictionally contacting the speed adjusters;

a bearing disk adapted to provide rotational force to the drive disk;

a threaded member on the drive disk; and a screw for engaging the threaded member, the screw positioned coaxial with and about a longitudinal axis of the continuously variable transmission.

2. The scooter of claim 1, wherein the screw is adapted to receive thrust from a thrust bearing to bias the screw away from the speed adjusters.

3. The scooter of claim 1, further comprising:

a drive shaft having a set of drive shaft ramps;

a disk having a set of screw ramps, the disk operationally engaged to the screw; and wherein the drive shaft ramps and screw ramps are adapted to operationally engage one another.

4. The scooter of claim 3, wherein the screw and the threaded member transfer to the drive disk axial force produced by the drive shaft ramps and the screw ramps.

5. The scooter of claim 3, further comprising a tension member, positioned between the drive shaft ramps and the screw ramps, the tension member adapted to maintain engagement of the drive shaft ramps and the screw ramps:

6. The scooter of claim 1, further comprising a set of perimeter ramps attached to the bearing disk, the perimeter ramps adapted to produce an axial force that is transferred to the drive disk.

7. The scooter of claim 6, further comprising a set of ramp bearings positioned between the bearing disk and the drive disk, the ramp bearings contacting the perimeter ramps.

8. A scooter comprising:

a motor of the scooter;

a continuously variable transmission coupled to the motor, the continuously variable transmission comprising:

a plurality of speed adjusters;

a drive disk adapted to operationally engage the speed adjusters;

a bearing disk adapted to provide rotational force to the drive disk; and a disengagement mechanism adapted to disengage the drive disk from the speed adjusters, the disengagement mechanism positioned between the bearing disk and the drive disk.

9. The scooter of claim 8, wherein the disengagement mechanism comprises a toothed wheel and a pawl adapted to prevent the drive disk from rotating onto the speed adjusters until an input force is applied to the transmission.

10. The scooter of claim 9, wherein the disengagement mechanism comprises at least two pawls.

11. The scooter of claim 9, the disengagement mechanism further comprising:

a threaded connector functionally interposed between the drive disk and the bearing disk; and wherein a rotation of the drive disk rotates the threaded connector to disengage the drive disk from the speed adjusters.

12. The scooter of claim 8, wherein the disengagement mechanism comprises:

a preloader having first and second ends, the first end adapted to rotate about an axis at a different rotational speed than the second end;

a bearing cage;

a toothed wheel, wherein said first end supports the toothed wheel and engages the bearing cage;

a pawl, wherein said second end supports the pawl such as to allow the pawl to engage the toothed wheel to prevent the drive disk from engaging the speed adjusters until an input force is applied to the transmission.

13. The scooter of claim 8, wherein the disengagement mechanism comprises:

a threaded connector functionally interposed between the drive disk and the bearing disk; and wherein a rotation of the drive disk rotates the threaded connector to disengage the drive disk from the speed adjusters.

14. The scooter of claim 13, wherein a rotation of the bearing disk causes the threaded member to rotate and thereby operationally engage the drive disk with the speed adjusters.

15. The scooter of claim 13, wherein the threaded member is adapted to apply an axial force to the drive disk.

16. The scooter of claim 13, further comprising a coiled spring adapted to engage the drive disk with the speed adjusters upon supply of an input rotation into the transmission.

17. A scooter comprising:

a motor of the scooter;

a continuously variable transmission coupled to the motor, the continuously variable transmission comprising:

a generally tubular split shaft coaxial with a longitudinal axis of the transmission and having a threaded end;

a rod having first and second ends and located coaxially within the split shaft;

a worm screw attached to the first end of the rod and having a set of external threads;

a sleeve having a set of internal threads that fit around and engage the external threads of the worm screw; and a shifting tube that engages the second end of the rod and has a set of internal threads that fit over and engage the threaded end of the split shaft.

18. The scooter of claim 17, further comprising a worm spring adapted to bias the rotation of the rod.

19. The scooter of claim 18, wherein the worm spring comprises a conical spring having a first end and a second end, wherein the conical spring fits coaxially over the longitudinal axis of the transmission and is attached at the first end to the rod and is attached at the second end to a stationary object.

20. The scooter of claim 17, further comprising:

a generally tubular grooved screw, coaxial with the longitudinal axis, having a threaded outer surface, a longitudinally grooved inner surface, and a bearing race on an inner diameter thereof; and an annular bearing in operable contact and coaxial with the bearing race.

* * * * *

UNITED STATES PATENT AND TRADEMARK OFFICE
CERTIFICATE OF CORRECTION

PATENT NO. : 7,166,058 B2
APPLICATION NO. : 11/006355
DATED : January 23, 2007
INVENTOR(S) : Miller et al.

It is certified that error appears in the above-identified patent and that said Letters Patent is hereby corrected as shown below:

In column 18, lines 62-63, in Claim 1, after "to the" delete "power source".

Signed and Sealed this

Twenty Second Day of April, 2008

JON W. DUDAS
*Director of the United States Patent and Trademark Office*